US009003783B2

United States Patent
Svihla et al.

(10) Patent No.: US 9,003,783 B2
(45) Date of Patent: Apr. 14, 2015

(54) BURNER ARRANGEMENT FOR A TWO-STROKE LOCOMOTIVE DIESEL ENGINE HAVING AN EXHAUST AFTERTREATMENT SYSTEM

(75) Inventors: Gary R. Svihla, Burr Ridge, IL (US); Ajay Patel, Joliet, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 696 days.

(21) Appl. No.: 13/173,250

(22) Filed: Jun. 30, 2011

(65) Prior Publication Data

US 2012/0079819 A1 Apr. 5, 2012

Related U.S. Application Data

(60) Provisional application No. 61/388,443, filed on Sep. 30, 2010.

(51) Int. Cl.
| | | |
|---|---|---|
| *F01N 3/10* | (2006.01) | |
| *F01N 3/027* | (2006.01) | |
| *F01N 3/035* | (2006.01) | |
| *F01N 9/00* | (2006.01) | |
| *F01N 11/00* | (2006.01) | |

(52) U.S. Cl.
CPC ............... *F01N 3/027* (2013.01); *F01N 3/035* (2013.01); *F01N 9/002* (2013.01); *F01N 11/002* (2013.01); *Y02T 10/47* (2013.01)

(58) Field of Classification Search
CPC ..... Y02T 10/26; Y02T 10/44; F01N 2610/03; F01N 2610/0253; F01N 2610/1453; F01N 2610/14; F01N 3/2033; F01N 3/106; F01N 3/36; F01N 3/025; F01N 3/023; F01N 2240/14; F01N 2410/00
USPC ................. 60/280, 287, 295, 297, 299, 300
See application file for complete search history.

(56) References Cited

U.S. PATENT DOCUMENTS

| | | | | |
|---|---|---|---|---|
| 5,067,320 | A * | 11/1991 | Kanesaki | 60/297 |
| 5,320,523 | A | 6/1994 | Stark | |
| 5,689,954 | A * | 11/1997 | Blocker et al. | 60/322 |
| 5,771,683 | A | 6/1998 | Webb | |
| 5,826,428 | A | 10/1998 | Blaschke | |
| 6,415,603 | B1 * | 7/2002 | Nowka et al. | 60/322 |
| 6,843,966 | B1 * | 1/2005 | Mahr | 422/172 |
| 8,069,655 | B2 * | 12/2011 | Carroll et al. | 60/286 |
| 8,511,068 | B2 * | 8/2013 | Tsujimoto et al. | 60/286 |
| 2002/0179726 | A1 * | 12/2002 | Baeuerle et al. | 237/69 |
| 2004/0113422 | A1 | 6/2004 | Atanasoski et al. | |
| 2004/0226291 | A1 * | 11/2004 | Diez et al. | 60/323 |
| 2007/0057564 | A1 * | 3/2007 | Colling | 298/1 H |
| 2010/0031643 | A1 * | 2/2010 | Cox et al. | 60/295 |

(Continued)

FOREIGN PATENT DOCUMENTS

| | | | | |
|---|---|---|---|---|
| DE | 3603498 A1 * | 8/1987 | | F01N 7/08 |
| JP | 2007255256 A * | 10/2007 | | |

*Primary Examiner* — Thomas Denion
*Assistant Examiner* — Patrick Maines
(74) *Attorney, Agent, or Firm* — Miller, Matthias & Hull LLP

(57) ABSTRACT

A diesel locomotive burner arrangement for controlling the temperature of exhaust gas at the exhaust aftertreatment system thereby controlling the oxidation of soot within the aftertreatment system filters. The burner is arranged in isolation of the locomotive engine to ensure freedom from vibration and excessive thermal input, as well as ease of servicing.

11 Claims, 33 Drawing Sheets

(56) References Cited

U.S. PATENT DOCUMENTS

| | | | |
|---|---|---|---|
| 2010/0186394 A1* | 7/2010 | Harrison et al. | 60/299 |
| 2011/0126524 A1* | 6/2011 | Askew | 60/287 |
| 2011/0252788 A1* | 10/2011 | Kleinfeld | 60/602 |
| 2012/0042632 A1* | 2/2012 | Inoue | 60/274 |
| 2012/0067331 A1* | 3/2012 | Pipis et al. | 123/564 |
| 2012/0315192 A1* | 12/2012 | Tsujimoto | 422/109 |
| 2013/0041571 A1* | 2/2013 | Nogi | 701/103 |
| 2013/0055711 A1* | 3/2013 | Hofer et al. | 60/602 |
| 2013/0098033 A1* | 4/2013 | Murakami et al. | 60/602 |

* cited by examiner

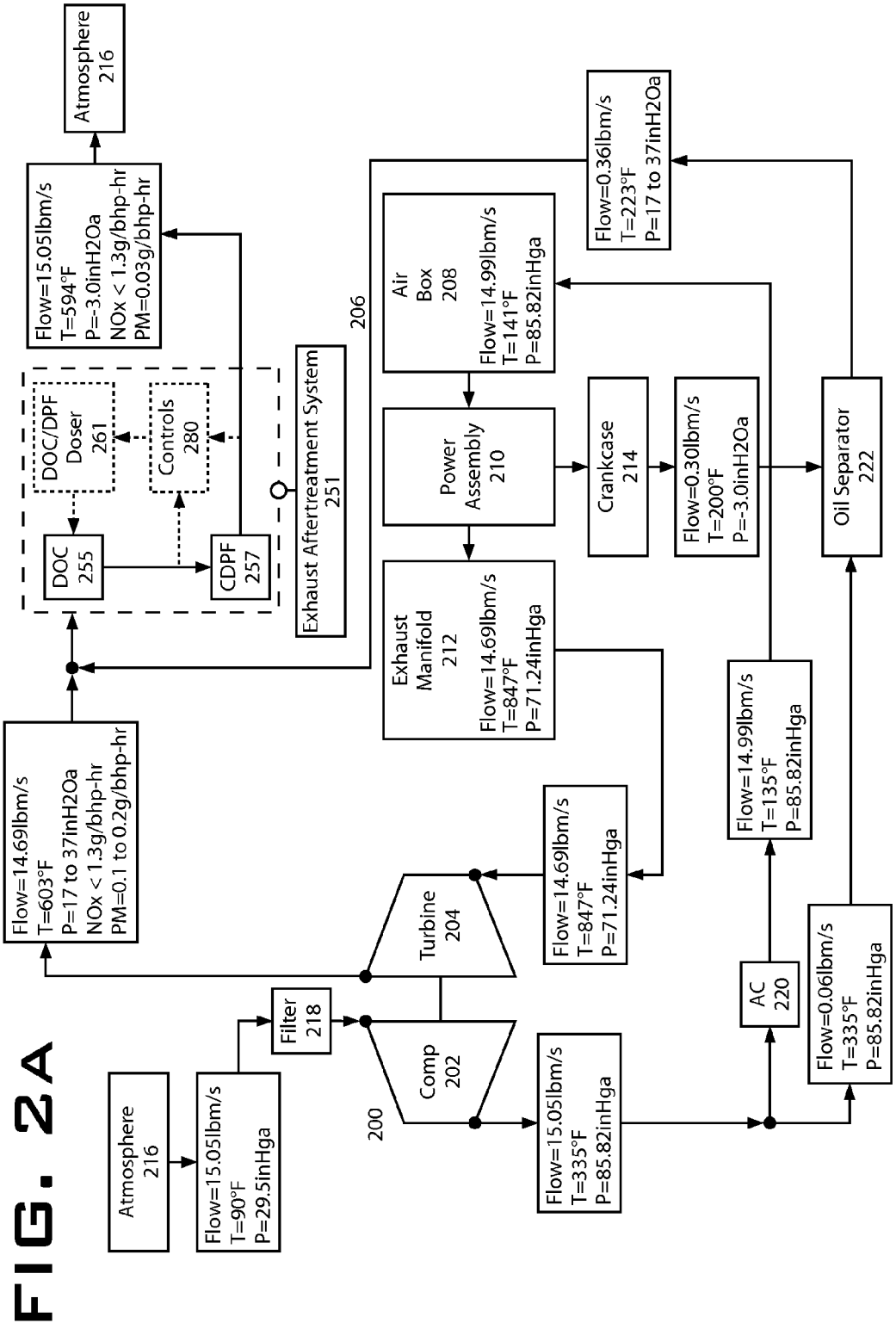

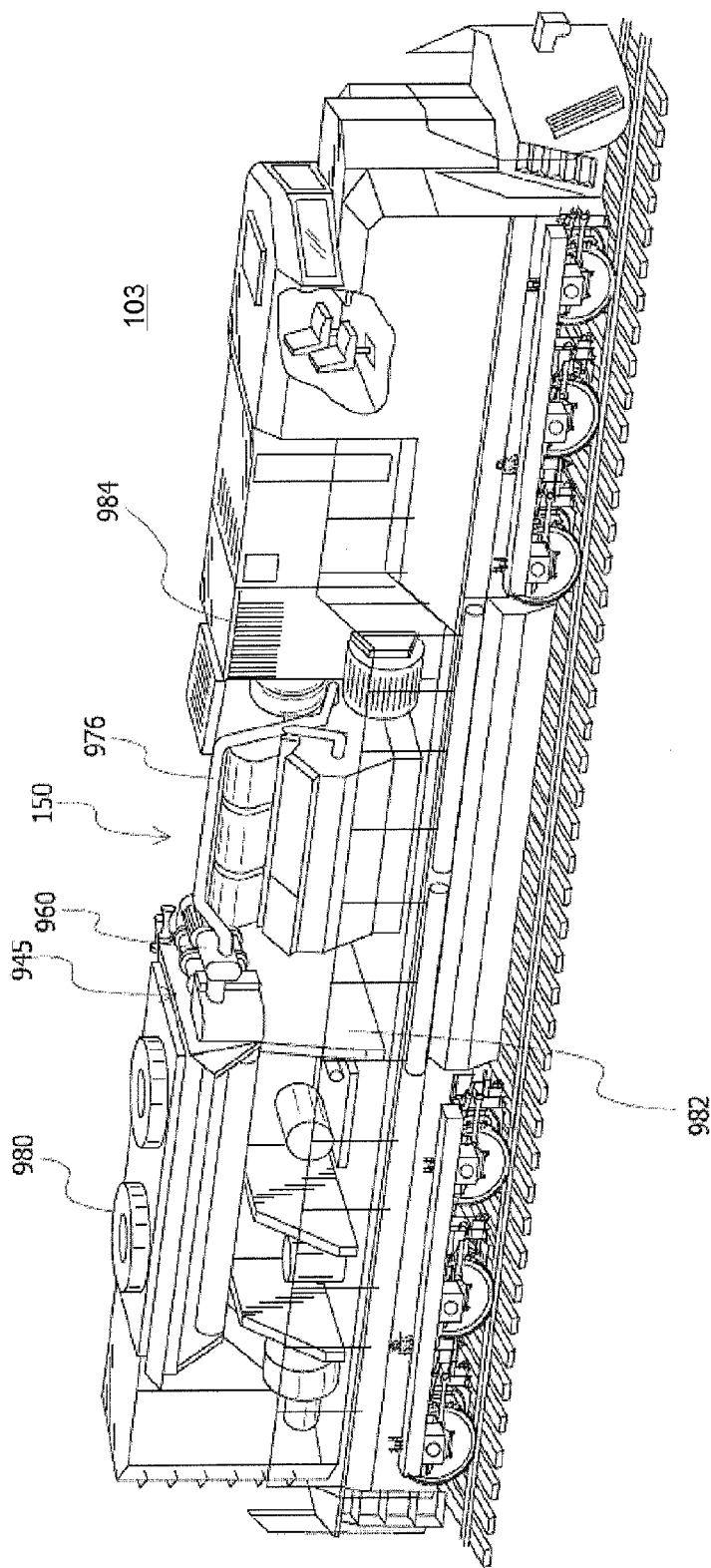

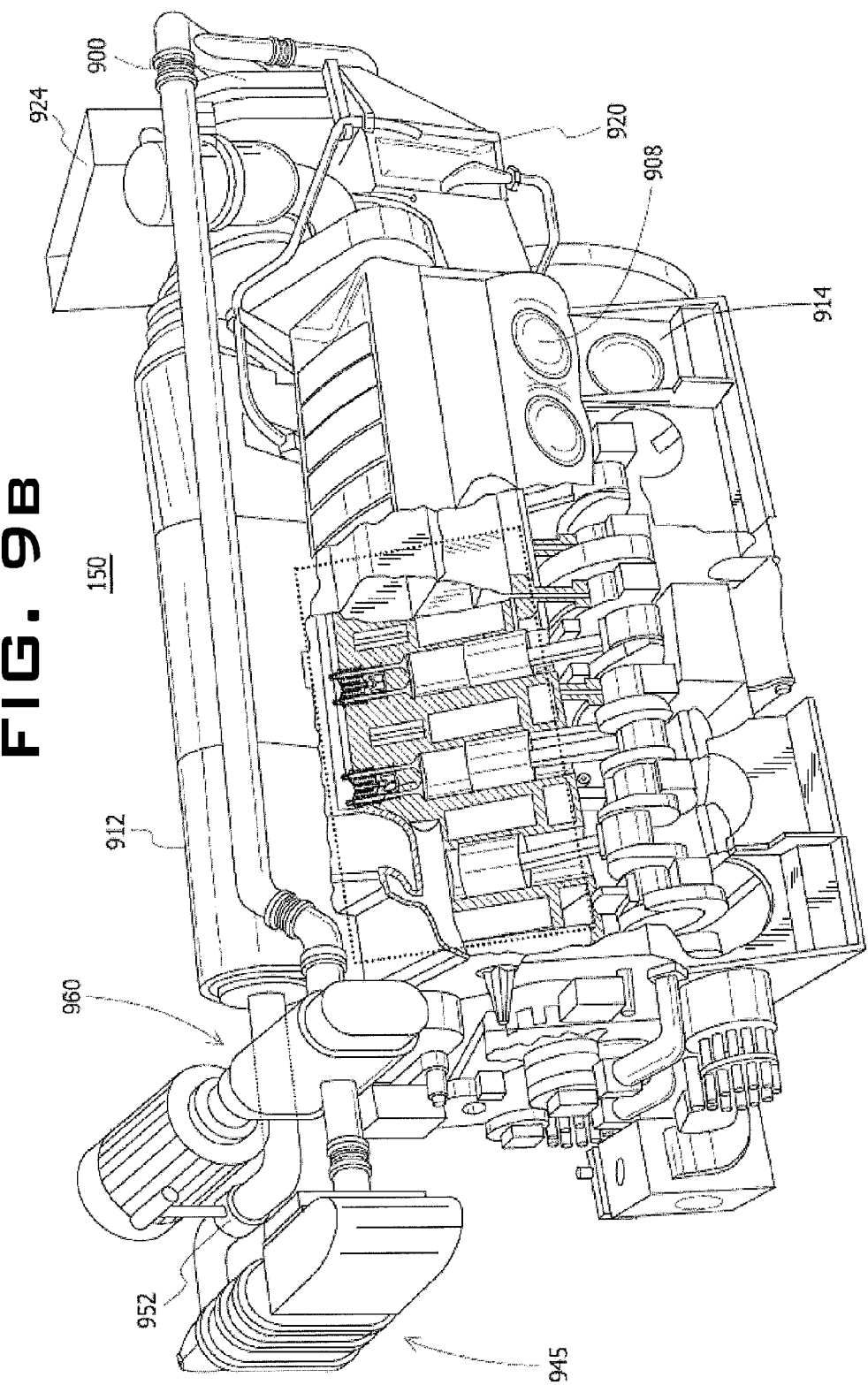

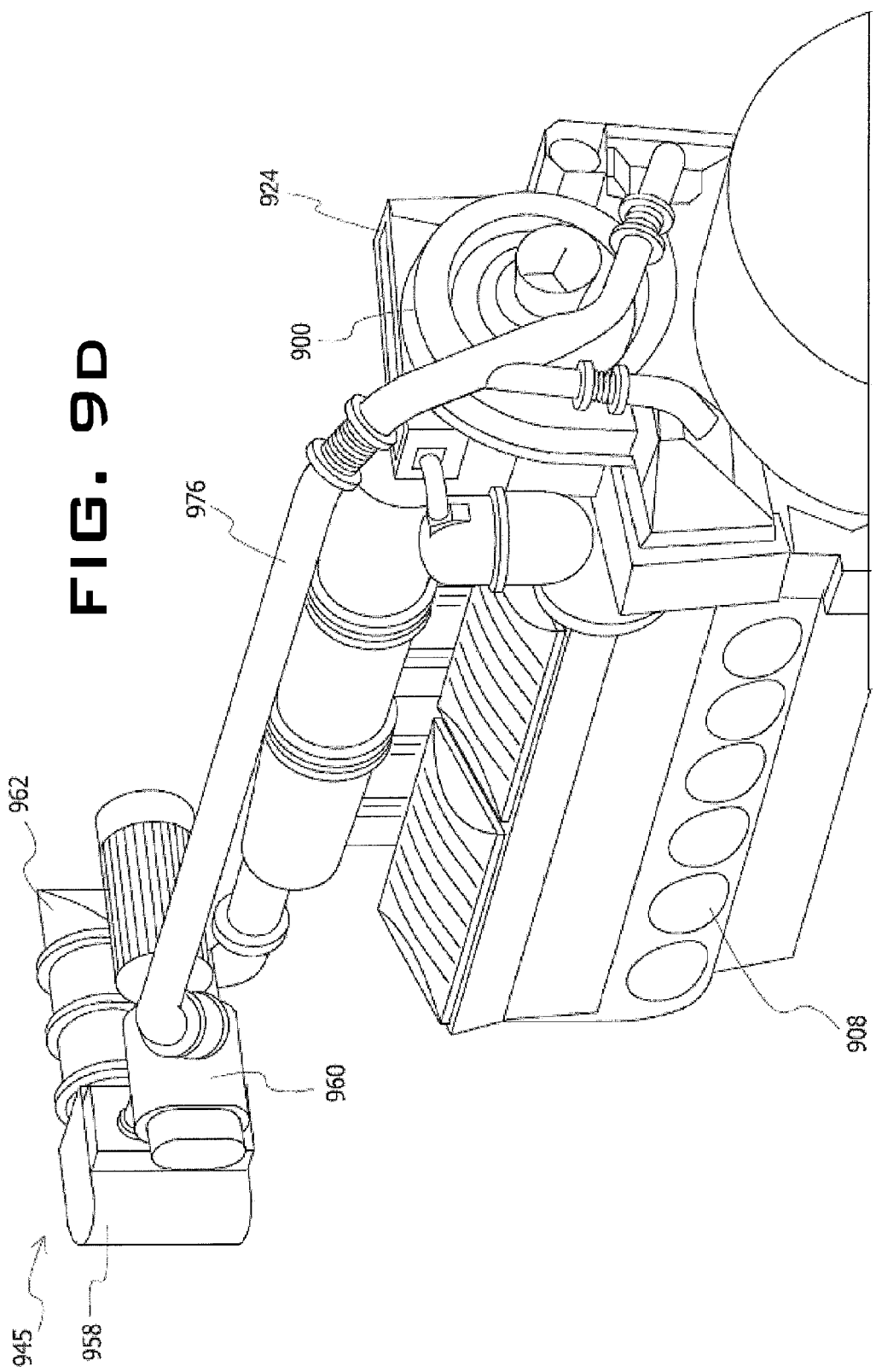

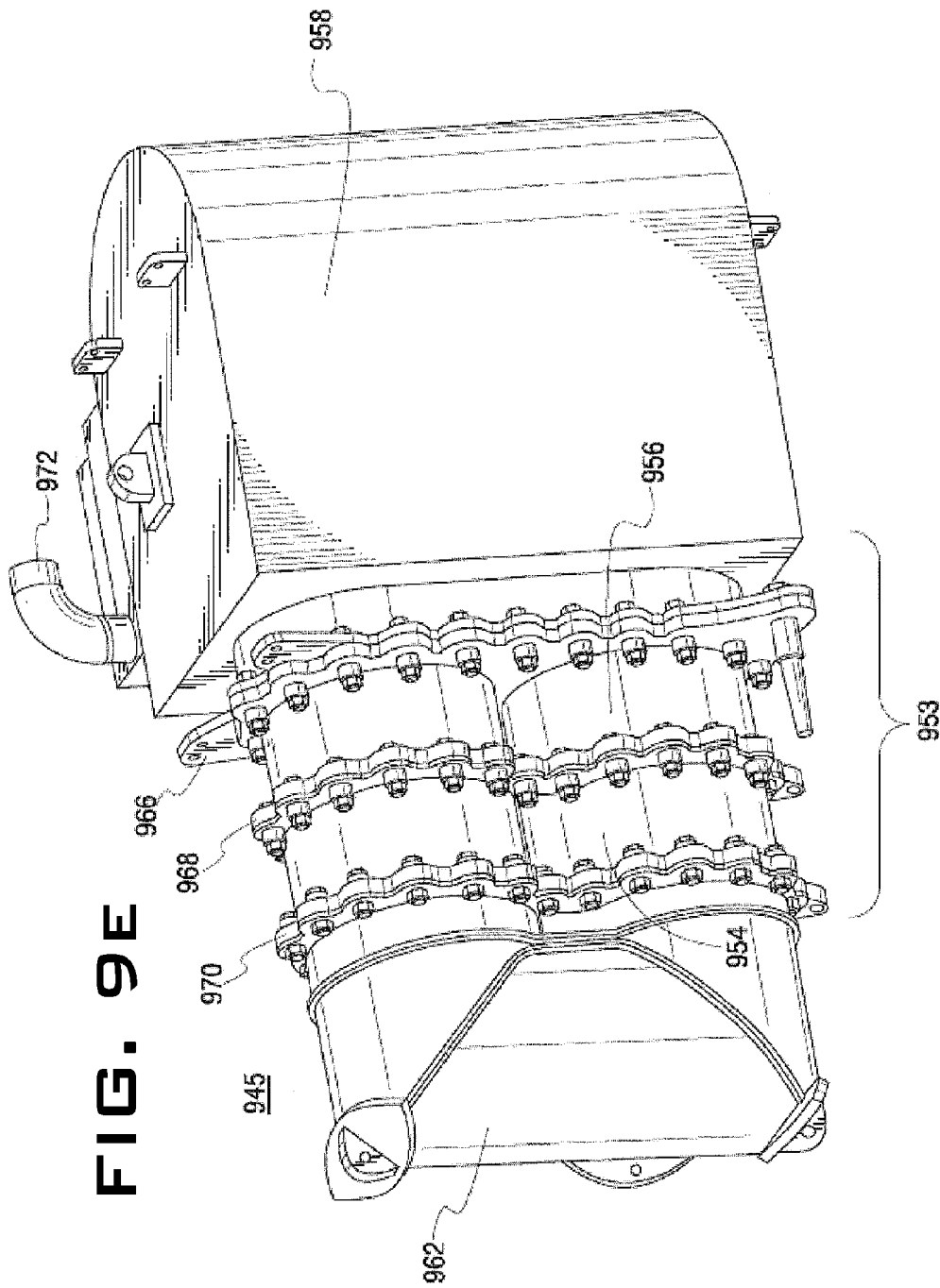

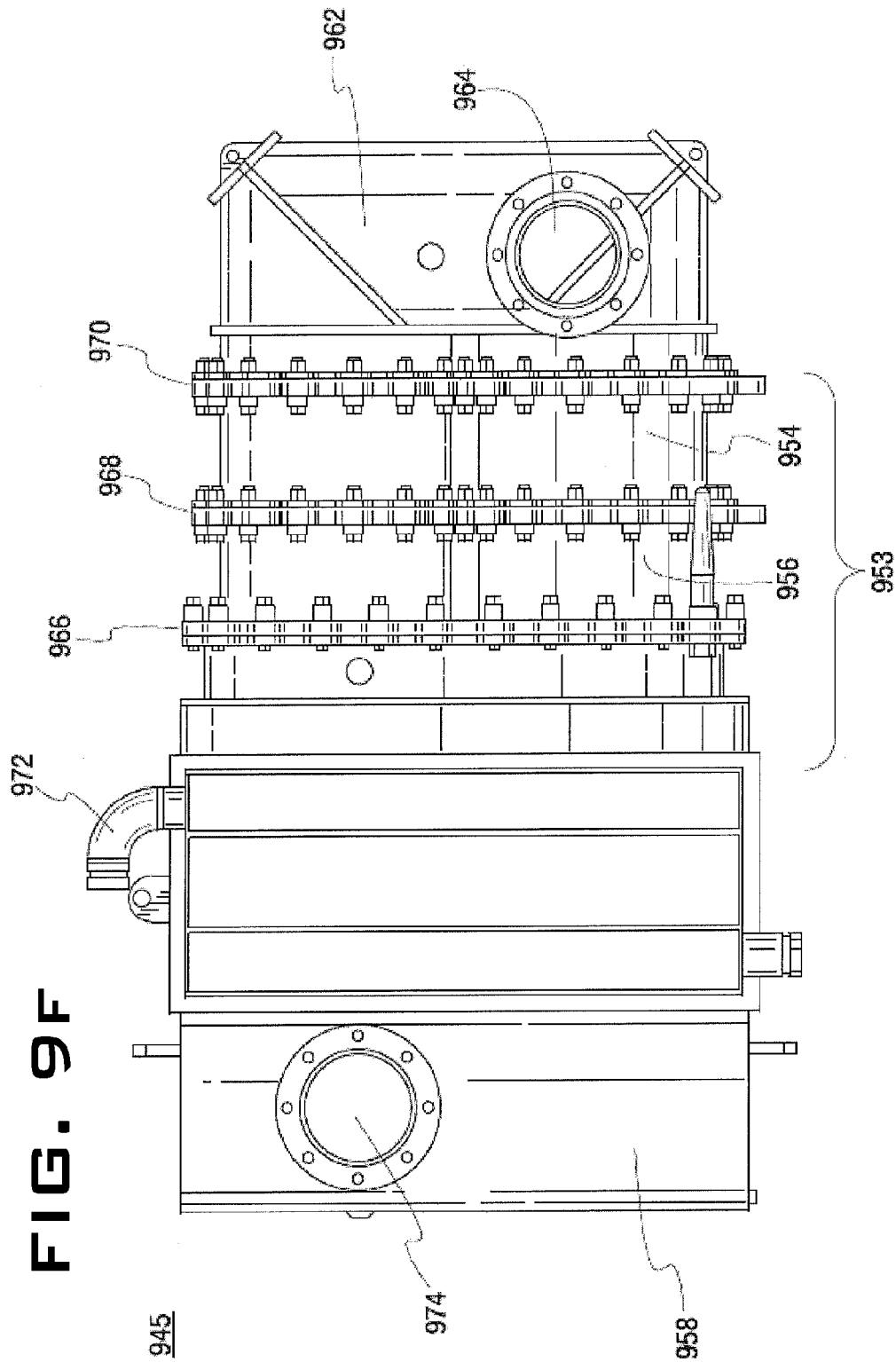

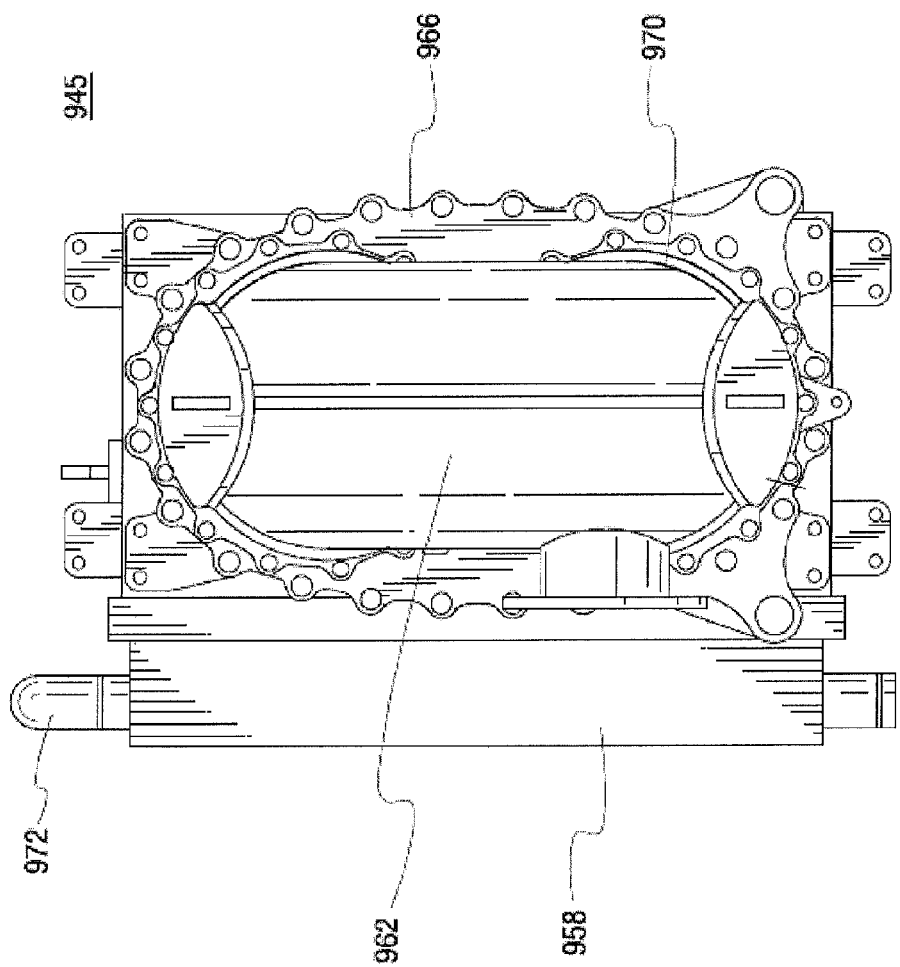

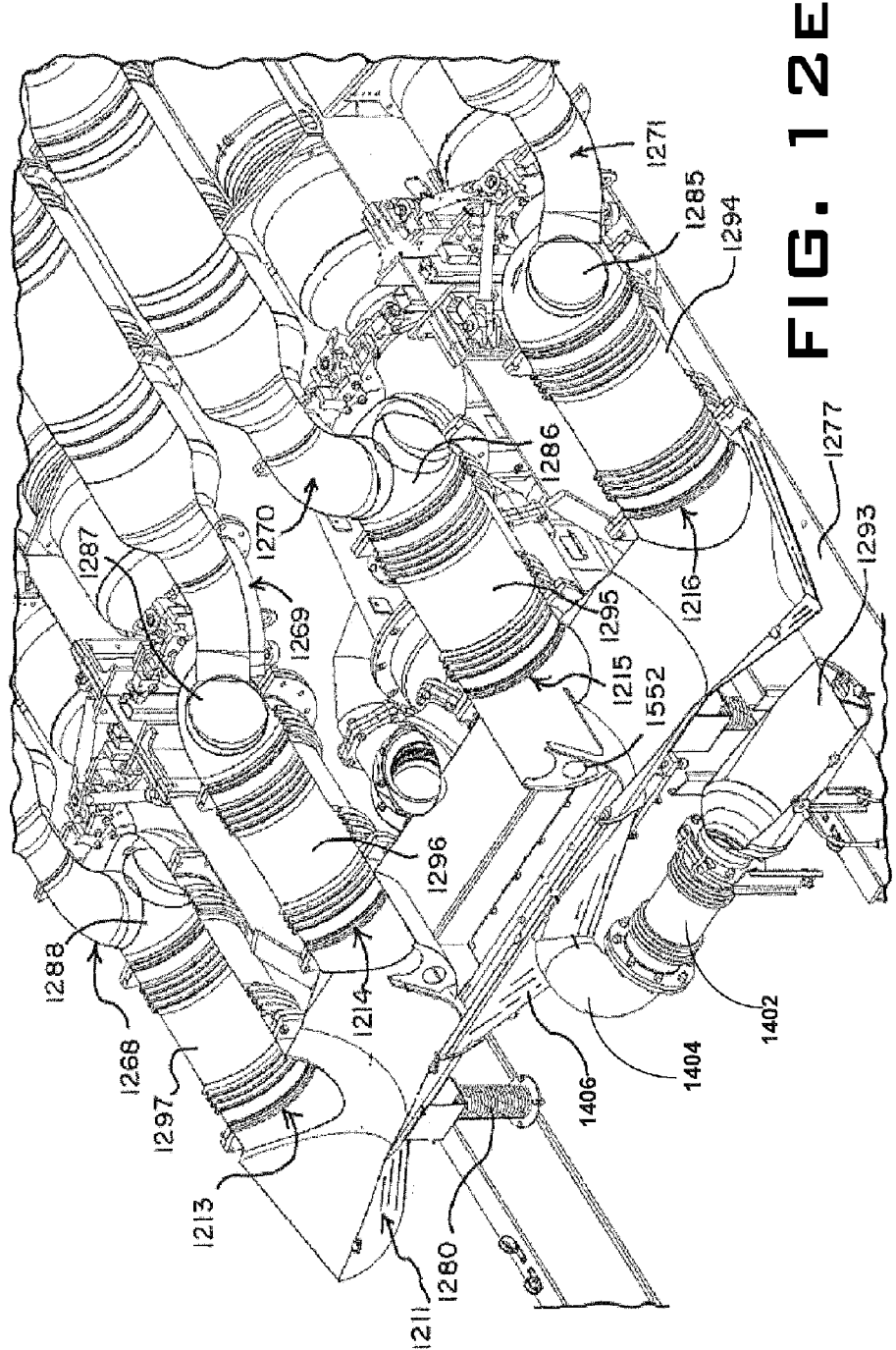

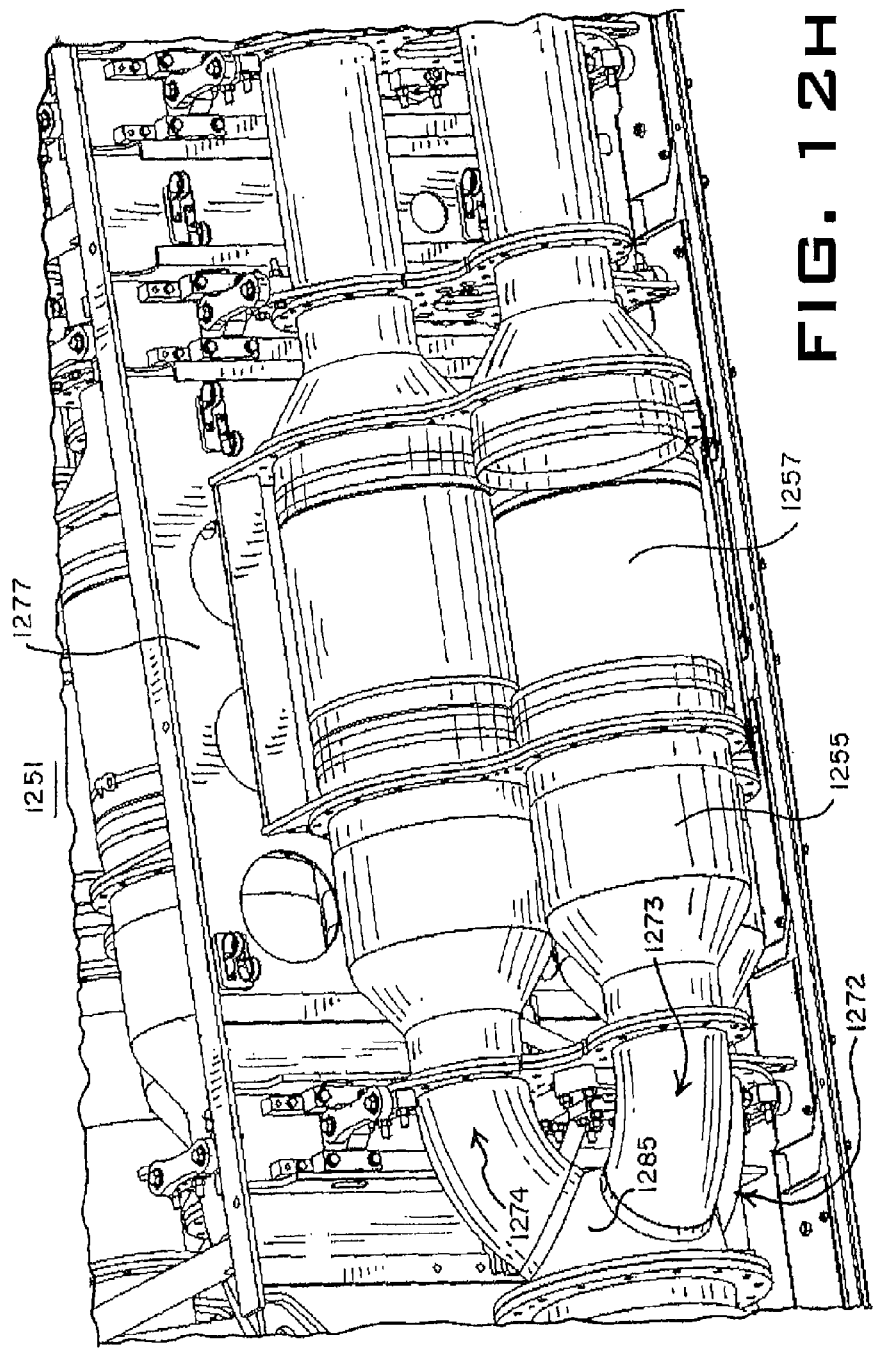

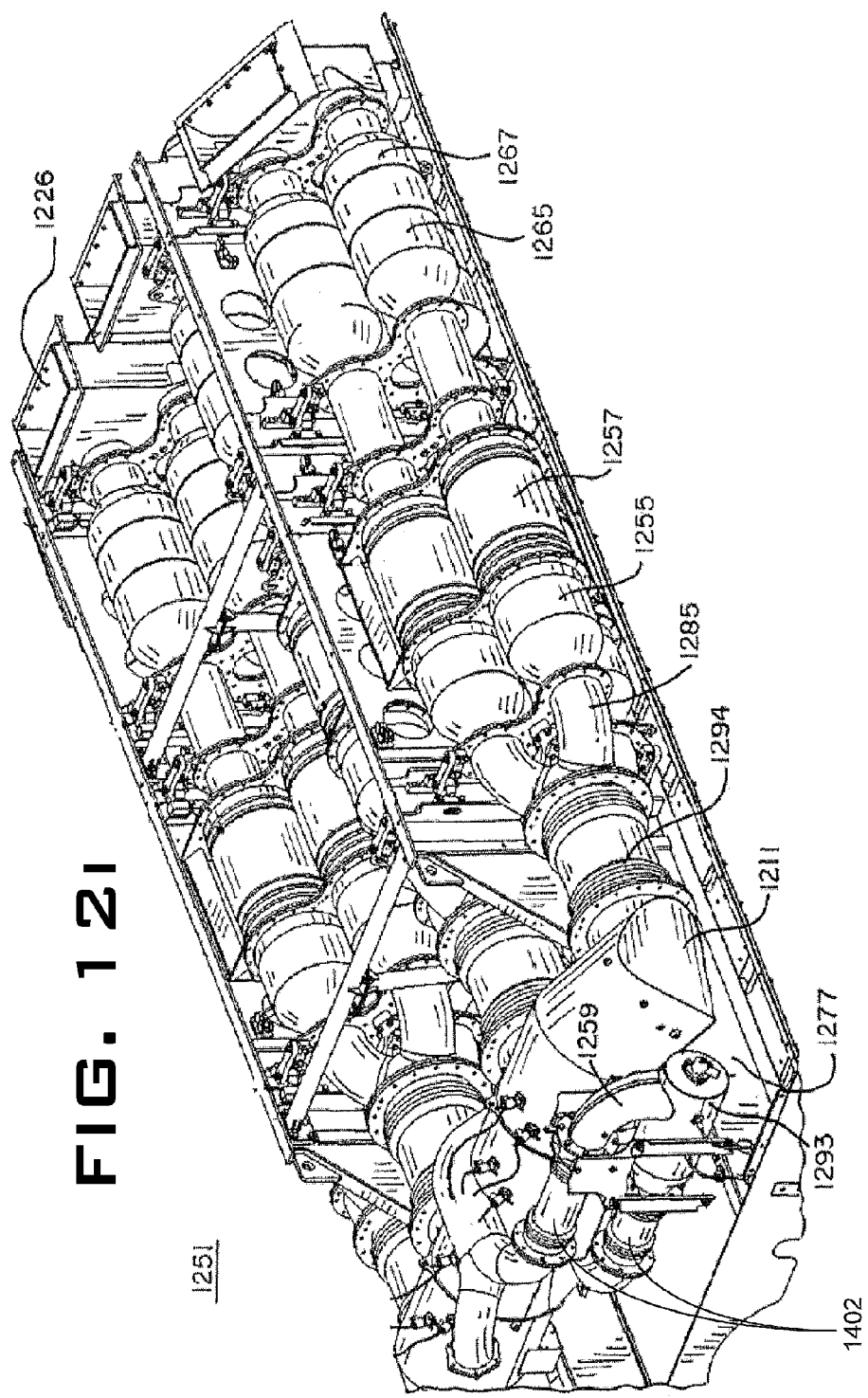

BURNER ARRANGEMENT FOR A TWO-STROKE LOCOMOTIVE DIESEL ENGINE HAVING AN EXHAUST AFTERTREATMENT SYSTEM

CROSS-REFERENCE TO RELATED APPLICATIONS

This application claims benefit under 35 U.S.C. §119(e) of U.S. Provisional Application Ser. No. 61/388,443, entitled "Exhaust Aftertreatment System for a Locomotive," filed Sep. 30, 2010, the complete disclosure thereof being incorporated herein by reference.

TECHNICAL FIELD

This application relates to a locomotive diesel engine and, more particularly, to a burner arrangement for a two-stroke locomotive diesel engine having an exhaust aftertreatment system.

BACKGROUND OF THE DISCLOSURE

The present disclosure generally relates to a locomotive diesel engine and, more specifically, to a burner arrangement for optimizing an exhaust aftertreatment system. The present disclosure exhaust aftertreatment systems may be implemented with a locomotive two-stroke uniflow scavenged diesel engine. This burner arrangement controls the temperature of exhaust at the exhaust aftertreatment system to control oxidation of soot on the filter thereof. As a result, the burner arrangement reduces $NO_X$ emissions.

FIG. 1a illustrates a locomotive 103 including a conventional uniflow two-stroke diesel engine system 101. As shown in FIGS. 1b and 1c, the locomotive diesel engine system 101 of FIG. 1a includes a conventional air system. Referring concurrently to both FIGS. 1b and 1c, the locomotive diesel engine system 101 generally comprises a turbocharger 100 having a compressor 102 and a turbine 104, which provides compressed air to an engine 106 having an airbox 108, power assemblies 110, an exhaust manifold 112, and a crankcase 114. In a typical locomotive diesel engine system 101, the turbocharger 100 increases the power density of the engine 106 by compressing and increasing the amount of air transferred to the engine 106.

More specifically, the turbocharger 100 draws air from the atmosphere 116, which is filtered using a conventional air filter 118. The filtered air is compressed by a compressor 102. The compressor 102 is powered by a turbine 104, as will be discussed in further detail below. A larger portion of the compressed air (or charge air) is transferred to an aftercooler (or otherwise referred to as a heat exchanger, charge air cooler, or intercooler) 120 where the charge air is cooled to a select temperature. Another smaller portion of the compressed air is transferred to a crankcase ventilation oil separator 122, which evacuates the crankcase 114 in the engine; entrains crankcase gas; and filters entrained crankcase oil before releasing the mixture of crankcase gas and compressed air into the atmosphere 116.

The cooled charge air from the aftercooler 120 enters the engine 106 via an airbox 108. The decrease in charge air intake temperature provides a denser intake charge to the engine, which reduces $NO_X$ emissions while improving fuel economy. The airbox 108 is a single enclosure, which distributes the cooled air to a plurality of cylinders. The combustion cycle of a diesel engine includes, what is referred to as, scavenging and mixing processes. During the scavenging and mixing processes, a positive pressure gradient is maintained from the intake port of the airbox 108 to the exhaust manifold 112 such that the cooled charge air from the airbox 108 charges the cylinders and scavenges most of the combusted gas from the previous combustion cycle.

More specifically, during the scavenging process in the power assembly 110, the cooled charge air enters one end of a cylinder controlled by an associated piston and intake ports. The cooled charge air mixes with a small amount of combusted gas remaining from the previous cycle. At the same time, the larger amount of combusted gas exits the other end of the cylinder via four exhaust valves and enters the exhaust manifold 112 as exhaust gas. The control of these scavenging and mixing processes is instrumental in emissions reduction as well as in achieving desired levels of fuel economy.

Exhaust gases from the combustion cycle exit the engine 106 via an exhaust manifold 112. The exhaust gas flow from the engine 106 is used to power the turbine 104 of the turbocharger 100, and thereby power the compressor 102 of the turbocharger 100. After powering the turbine 104, the exhaust gases are released into the atmosphere 116 via an exhaust stack 124 or silencer.

The exhaust gases released into the atmosphere by a locomotive diesel engine include particulates, nitrogen oxides ($NO_X$) and other pollutants. Legislation has been passed to reduce the amount of pollutants that may be released into the atmosphere. Traditional systems have been implemented which reduce these pollutants, but at the expense of fuel efficiency.

The various embodiments of the present disclosure aftertreatment system are able to exceed, what is referred in the industry as, the Environmental Protection Agency's (EPA) Tier II (40 CFR 92), Tier III (40 CFR 1033), and Tier IV (40 CFR 1033) emission requirements, as well as the European Commission (EURO) Tier IIIb emission requirements. These various emission requirements are cited by reference herein and made a part of this patent application.

In accordance with an embodiment of the disclosure, an exhaust aftertreatment system for a locomotive is described for reducing pollutants. This system generally includes a turbocharger mixing manifold adapted to receive exhaust from the locomotive engine and stabilize the exhaust from the locomotive engine; a filtration system coupled to the turbocharger mixing manifold including a catalyst and filter adapted to filter particulate matter, hydrocarbons and carbon monoxide from the exhaust; and a $NO_X$ reduction system situated inline with the filtration system adapted to reduce $NO_X$ from the exhaust.

According to various aspects of the present disclosure, the exhaust aftertreatment system may include various additional features. In one embodiment, the exhaust aftertreatment system includes a filtration injection system adapted to add fuel to the exhaust in the turbocharger mixing manifold, where the turbocharger mixing manifold is sized and shaped to promote mixing of the exhaust and fuel contained therein. Specifically, the fuel in this mixture reacts with oxygen in the presence of the catalyst, increasing the temperature of the exhaust, and thereby promoting oxidation of soot on the filter in the filtration system. The filtration system may be comprised of a diesel oxidation catalyst (DOC) or a diesel particulate filter (DPF). A filtration control system is also described for monitoring and controlling particulate buildup on the filter.

In another embodiment, the $NO_X$ reduction system may include a selective catalytic reduction (SCR) catalyst and an ammonia slip catalyst (ASC). A $NO_X$ reduction control system is also described for monitoring and controlling the $NO_X$ reduction system. A $NO_X$ reduction system injection system may further be provided to add a $NO_X$ reduction reagent to the exhaust. The $NO_X$ reduction system injection system is preferably situated upstream of the $NO_X$ reduction system.

In yet another embodiment, the exhaust aftertreatment system may further include a heating device, such as a burner, situated with respect to the turbocharger mixing manifold for heating the exhaust and a control system for the heating device. Specifically, this burner arrangement controls the temperature of exhaust at the exhaust aftertreatment system to control oxidation of soot on the filter thereof. As a result, the burner arrangement reduces $NO_X$ emissions.

Various embodiments of an exhaust aftertreatment system are shown and described which may operate within a locomotive operating environment and be placed within the limited size constraints of the locomotive. In one embodiment, an exhaust aftertreatment system is shown and described having a filtration system situated inline with a $NO_X$ reduction system. In another embodiment, an exhaust aftertreatment system is shown having an integral housing having a filtration system and a $NO_X$ reduction system. Because exhaust from a locomotive engine is generally not uniform, the turbocharger mixing manifold may be sized and shaped to uniformly distribute the exhaust to the filtration system. For example, the turbocharger mixing manifold may be sized and shaped such that the exhaust enters a volume greater than the volume at which exhaust is expelled from the engine.

According to another aspect of the present disclosure, an exhaust aftertreatment system is provided for a locomotive, which includes a support system and a connection system to the locomotive engine and structure. The exhaust aftertreatment system includes a turbocharger mixing manifold coupled to an exhaust outlet of the locomotive engine and an emissions reduction system flexibly coupled to the turbocharger mixing manifold to isolate operational loads of the engine from the locomotive. In one example, a support structure is provided such that the mass load of the exhaust aftertreatment system is supported by the locomotive via the support structure. In another example, a connection system is provided to permit the exhaust aftertreatment system to move relative to its loads and account for thermal expansion.

These exhaust aftertreatment systems may be used in conjunction with various exhaust gas recirculation systems (including those described herein) to further reduce exhaust emissions from the engine.

It will be noted that many industries utilize a device commonly known as a burner to mix combustible fuel with air for the purpose of heating either additional gas or the outside of a vessel which may contain gas, liquid or even solid material. Most burners employ an internal combustion chamber where the exhaust gas mixes with fuel and typically external air before ignitions occurs via a heat generating source (e.g. spark plug). Some applications, such as road traveling cars and trucks, direct the flow of all exhaust gas from their engines, through such a burner device for the purpose of increasing the exhaust gas temperature. As such, the burner assembly body remains integral with the exhaust gas conveyance pipes.

Typically, all exhaust gas for a diesel engine aftertreatment system is routed through one or more burners, and partial flow designs mount directly to the engine exhaust manifold using simple pressure-based bypass valve. The current practice of mounting a burner directly to the engine exhaust components, while limiting initial costs and packaging requirements, does so at the expense of reliability and serviceability. Furthermore, the locomotive environment remains a difficult combination of excessive heat and vibration that is not common in road traveling automobiles and trucks. Although there are several competing designs currently available, the conventional burner devices do not possess the necessary robustness in their current state of development.

Further, a burner designed to increase the temperature of exhaust gas upstream of a locomotive aftertreatment system remains a complicated apparatus which controls the addition of burning diesel fuel into the exhaust. Additionally, the design of mixing components within the burner creates aerodynamic turbulence which increases pressure losses for the entire engine exhaust system.

Accordingly, it is a general object of the present disclosure to provide an exhaust aftertreatment system which reduces the amount of pollutants (e.g. particulates, nitrogen oxides ($NO_X$) and other pollutants) released by the diesel engine while achieving desired fuel efficiency.

It is a more specific object of the present disclosure to provide a burner arrangement for a two-stroke locomotive diesel engine having an exhaust aftertreatment system.

It is yet another object of the disclosure to provide a burner arrangement that only requires a portion of the main exhaust flow to raise the bulk temperature of the exhaust to minimize the losses due to the aerodynamic turbulence of the mixing components within the burner.

Still another object of the present disclosure is to provide an external mounting of the burner to improve reliability through isolation from excessive thermal load as well as engine vibration.

Yet another object of the present disclosure is to provide a burner configuration that improves maintenance due to the modularity inherent in the mounting arrangement.

Yet still another object of the present disclosure is to provide a burner that is physically isolated and ensures improved serviceability.

The following description is presented to enable one of ordinary skill in the art to make and use the disclosure and is provided in the context of a patent application and its requirements. Various modifications to the preferred embodiment and the generic principles and features described herein will be readily apparent to those skilled in the art. Thus, the present disclosure is not intended to be limited to the embodiments shown, but is to be accorded the widest scope consistent with the principles and features described herein.

SUMMARY OF THE DISCLOSURE

According to one embodiment of the present disclosure, there is provided a heating device assembly that controls the temperature of the exhaust at the exhaust aftertreatment system of a locomotive diesel engine. The heating device body is mounted on an isolated structure that is separate from both the locomotive engine and the exhaust aftertreatment system. It includes an exhaust gas inlet end coupled to an exhaust manifold of the engine through primary burner pipes and associated flexible couplers, and an exhaust gas outlet end coupled to the aftertreatment system through secondary burner pipes and associated flexible couplers.

There is also provided a system for controlling the temperature of locomotive diesel engine exhaust gas as it enters an exhaust aftertreatment system. The system includes an engine exhaust manifold adapted to receive exhaust from the engine; a heating device situated in relation to the exhaust manifold; and an exhaust aftertreatment system turbocharger mixing manifold adapted to receive the exhaust from the heating device.

There is further provided a burner system for increasing the temperature of exhaust gas upstream of a locomotive aftertreatment system. The system includes an engine manifold in communication with a locomotive engine and having a thermal load generated from the engine; a burner is positioned in isolation from the engine and the exhaust manifold so as to maintain a detachment from the thermal load while maintaining communication with the exhaust manifold for receiving the exhaust; and an exhaust aftertreatment system in communication with the burner for receiving the exhaust.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 1b is a partial cross-sectional perspective view of the two-stroke diesel engine system of FIG. 1a.

FIG. 2a is a system diagram of a two-stroke diesel engine having an exhaust aftertreatment system.

FIG. 9a is a perspective view of a locomotive including a two-stroke diesel engine system with an EGR system in accordance with an embodiment of the present disclosure.

FIG. 9b is a partial cross-sectional perspective view of the two-stroke diesel engine system with an EGR system of FIG. 9a.

FIG. 9c is a top view of the two-stroke diesel engine system with an EGR system of FIG. 9a.

FIG. 9d is a side view of the two-stroke diesel engine system with an EGR system of FIG. 9a, showing ducts for introducing the recirculated exhaust gas into the engine.

FIG. 9e is a perspective view of an embodiment of an EGR module for use with the EGR system of FIG. 9a.

FIG. 9f is a side view of the EGR module of FIG. 9e.

FIG. 9g is a front side view of the EGR module of FIG. 9e.

FIG. 12b is another perspective view of the embodiment of the exhaust aftertreatment system of FIG. 12a.

FIG. 12c is a bottom perspective view of the embodiment of the exhaust aftertreatment system of FIG. 12a.

FIG. 12d is a top view of the embodiment of the exhaust aftertreatment system of FIG. 12a.

FIG. 12e is a top perspective view of the embodiment of the exhaust aftertreatment system of FIG. 12a.

FIG. 12h is a detailed side view of the embodiment of the exhaust aftertreatment system of FIG. 12a including a connection system.

FIG. 12i is a perspective view of the embodiment of the exhaust aftertreatment system of FIG. 12a including a support structure.

FIG. 12l is a partial cross-sectional perspective view of a locomotive including the exhaust aftertreatment system of FIG. 12a.

DETAILED DESCRIPTION OF THE DRAWINGS

Figure 1A:
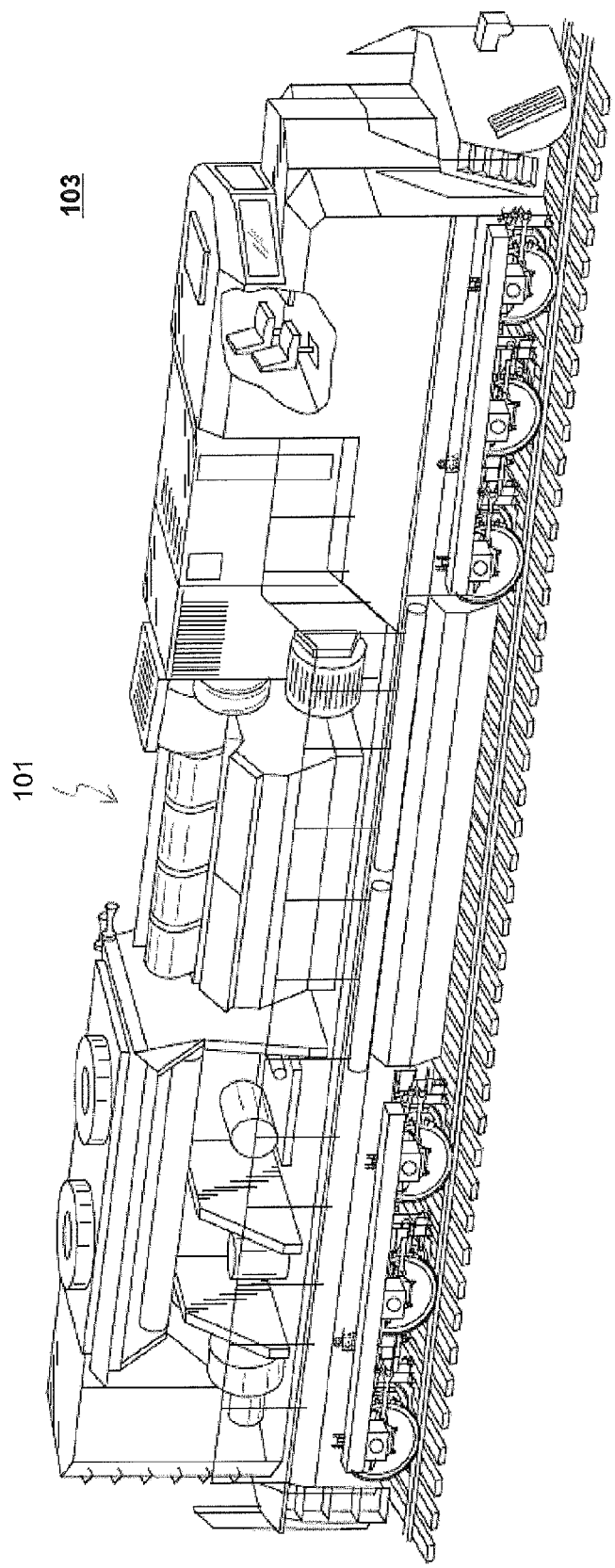
FIG. 1a is a perspective view of a locomotive including a two-stroke diesel engine system.
Figure 1B:
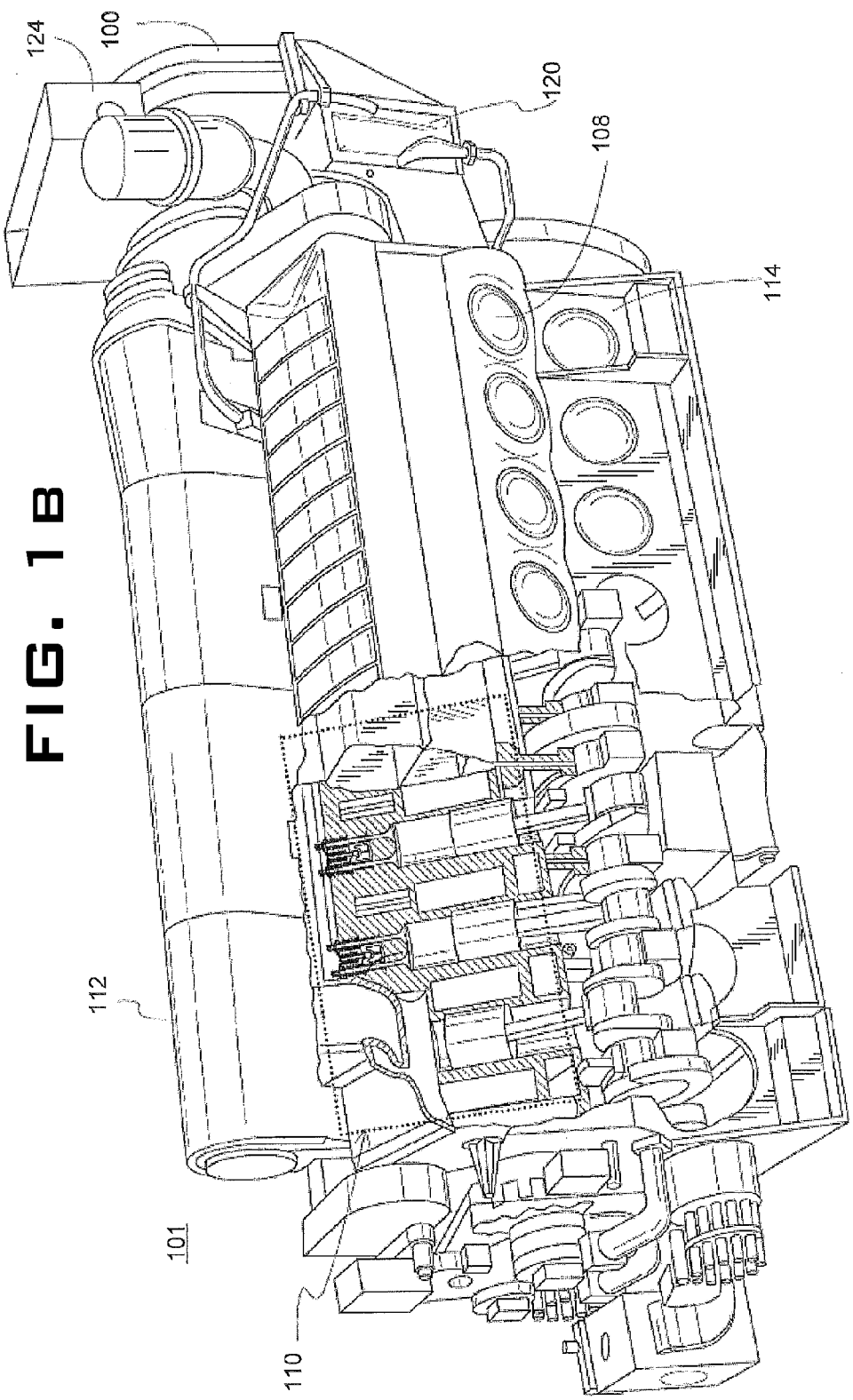
Figure 1C:
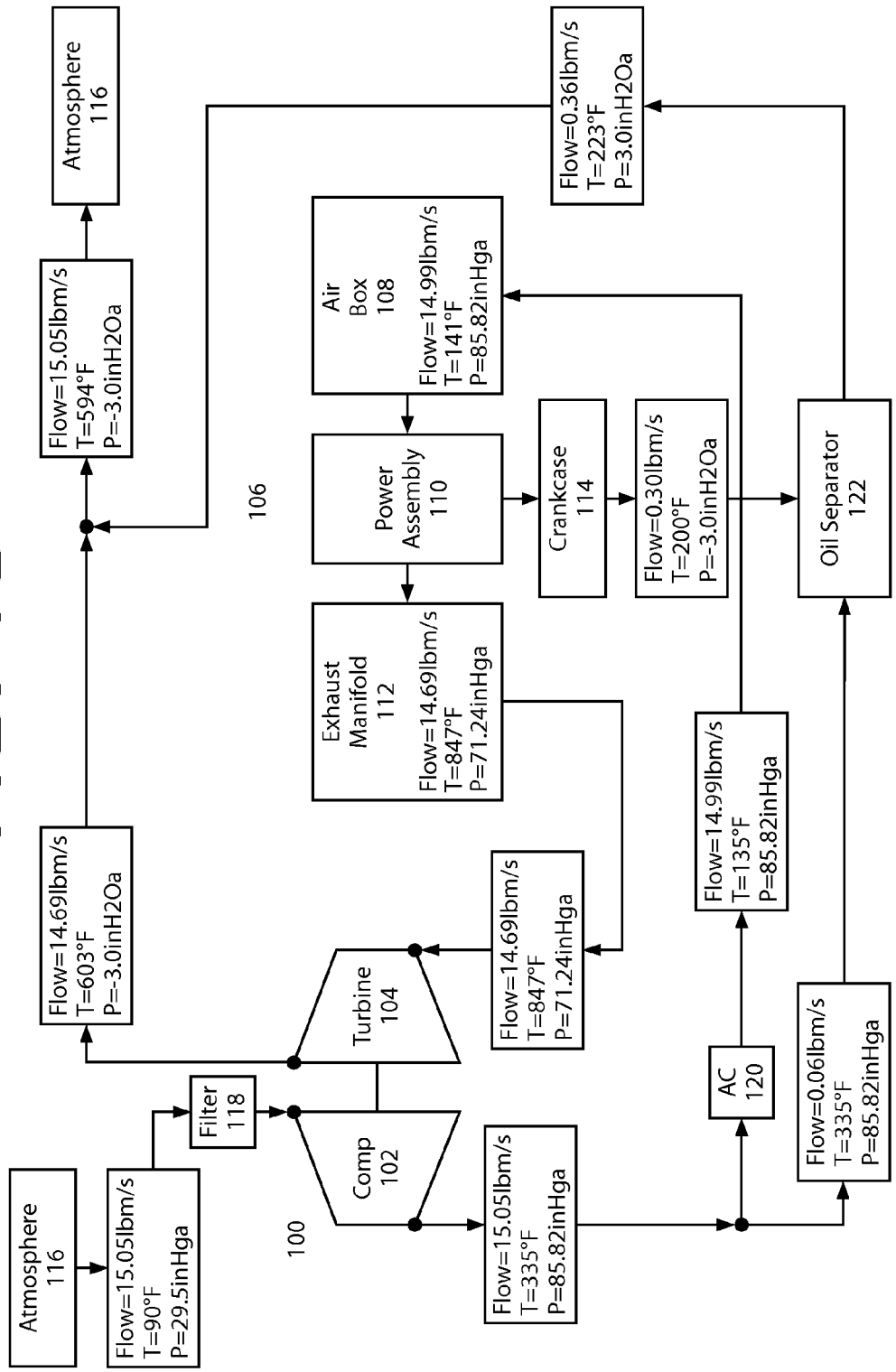
FIG. 1c is a system diagram of the two-stroke diesel engine of FIG. 1b having a conventional air system.

The present system is directed to an exhaust aftertreatment system for a locomotive diesel engine to reduce pollutants, namely particulate matter and $NO_X$ emissions released from the engine. The present disclosure exhaust aftertreatment system may be further implemented in conjunction with an exhaust gas recirculation (EGR) system which enhances the unique scavenging and mixing processes of a locomotive uniflow two-stroke diesel engine in order to further reduce $NO_X$ emissions while achieving desired fuel economy. Further provided are embodiments that include various exhaust aftertreatment system components, which may be placed within the limited size constraints of the locomotive of FIG. 1a and which are designed for ease of maintainability. The various exhaust aftertreatment system embodiments described herein may be used in conjunction with an EGR system, which may also be placed within the limited size constraints of the locomotive of FIG. 1a for ease of maintainability.

The present disclosure may further be enhanced by adapting the various engine parameters, the EGR system parameters, and the exhaust aftertreatment system parameters. For example, as discussed above, emissions reduction and achievement of desired fuel efficiency may be accomplished by maintaining or enhancing the scavenging and mixing processes in a uniflow two-stroke diesel engine (e.g., by adjusting the intake port timing, intake port design, exhaust valve design, exhaust valve timing, EGR system design, engine component design and turbocharger design).

The various embodiments of the present disclosure may be applied to locomotive two-stroke diesel engines having various numbers of cylinders (e.g., 8 cylinders, 12 cylinders, 16 cylinders, 18 cylinders, 20 cylinders, etc.). The various embodiments may further be applied to other two-stroke uniflow scavenged diesel engine applications other than for locomotive applications (e.g., marine applications). The various embodiments may also be applied to other types of diesel engines (e.g., four-stroke diesel engines).

As shown in FIG. 2a, the present disclosure may include an exhaust aftertreatment system 251 for reducing particulate matter (PM), hydrocarbons and/or carbon monoxide emissions from the exhaust manifold 212 of the engine 206. In this system, the engine 206 may be adapted to have reduced NOx emissions (e.g., less than 1.3 g/bhp-hr). In order to reduce further emissions from the exhaust, the exhaust aftertreatment system 251 generally includes a filtration system 255/257 to filter other emissions including particulate matter from the exhaust. More specifically, the exhaust aftertreatment system 251 may include a diesel oxidation catalyst (DOC) 255 and a diesel particulate filter (DPF) 257. The DOC 255 uses an oxidation process to reduce the particulate matter (PM), hydrocarbons and/or carbon monoxide emissions in the exhaust gases. The DPF 257 includes a filter to reduce PM and/or soot from the exhaust gases. The DOC/DPF 255/257 arrangement may be adapted to passively regenerate and oxidize soot. Although a DOC 255 and DPF 257 are shown, other comparable filters may be used. A filtration control system 280 may be provided, which monitors and maintains the cleanliness of the DPF 257. In another embodiment, a control system 280 determines and monitors the pressure differential across the DPF 257 using pressure sensors. As discussed above, the DOC/DPF arrangement 255/257 may be adapted to passively regenerate and oxidize soot within the DPF 257. However, the DPF 257 will accumulate ash and some soot, which must be removed in order to maintain the DPF efficiency. As ash and soot accumulate, the pressure differential across the DPF 257 increases. Accordingly, the control system 280 monitors and determines whether the DPF 257 has reached a select pressure differential at which the DPF 257 requires cleaning or replacement. In response thereto, the control system 280 may signal an indication that the DPF 257 requires cleaning or replacement.

Alternatively, a control system 280 is shown to be coupled to a DOC/DPF doser 261 (e.g., a hydrocarbon injector), which adds fuel onto the catalyst for the DOC/DPF arrangement 255/257 for active regeneration of the filter. The fuel reacts with oxygen in the presence of the catalyst, which increases the temperature of the exhaust gas to promote oxidation of soot on the filter. In yet another embodiment, the control system 280 may be coupled to a heating device 293, which may be in the form of an optional burner or other heating element, for controlling the temperature of the exhaust gas to control oxidation of soot on the filter.

Figure 2B:
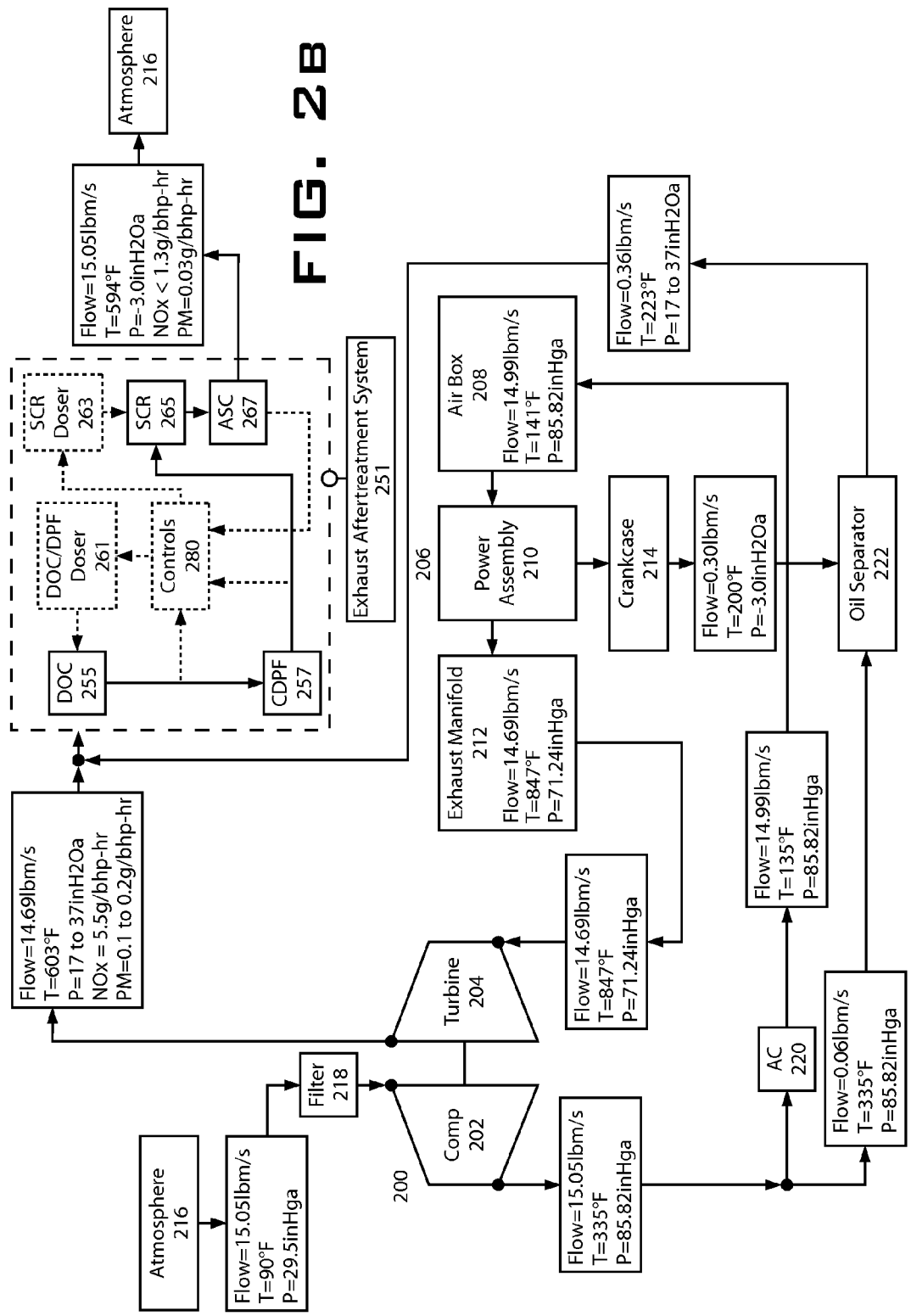
FIG. 2b is a system diagram of a two-stroke diesel engine having an exhaust aftertreatment system including a selective catalytic reduction catalyst and ammonia slip catalyst.

As shown in FIG. 2b, the present system may include an exhaust aftertreatment system 251 for reducing $NO_X$ emissions and the particulate matter (PM), hydrocarbons and/or carbon monoxide emissions released to the atmosphere 216. In this particular arrangement, the exhaust aftertreatment system 251 further includes a selective catalytic reduction (SCR) catalyst 265 and ammonia slip catalyst (ASC) 267 in addition to a filtration system 255/257 similar to that shown and described with respect to FIG. 2a. More specifically, the exhaust aftertreatment system 251 includes a diesel oxidation catalyst (DOC) 255, a diesel particulate filter (DPF) 257, a control system (for filtration) 280 and DOC/DPF doser 261 similar to that shown and described with respect to FIG. 2a. In yet another embodiment, the exhaust aftertreatment system 251 may further include a heating element in the form of an optional burner or other heating element for controlling the temperature of the exhaust gas to control oxidation of soot on the filter.

Additionally, the exhaust aftertreatment system 251 of FIG. 2b further includes a selective catalytic reduction (SCR) catalyst 265 and ammonia slip catalyst (ASC) 267 adapted to lower $NO_X$ emissions of the engine 206. The SCR 265 and ASC 267 are further coupled to an SCR doser 263 for dosing an SCR reductant fluid or SCR reagent (e.g., urea-based, diesel exhaust fluid (DEF)), as specifically illustrated in FIG. 2c. Upon injection of the SCR reductant fluid or SCR reagent, the $NO_X$ from the exhaust reacts with the reductant fluid over the catalyst in the SCR 265 and ASC 267 to form nitrogen and water. In another embodiment, although a urea-based SCR 265 is shown, other SCRs known in the art may also be used (e.g., hydrocarbon based SCRs, solid SCRs, De-$NO_X$ systems, etc.). In yet another embodiment, the system may be adapted to lower NOX emissions prior to lowering the particulate matter (PM), hydrocarbons and/or carbon monoxide emissions. In such an arrangement, the SCR system 265/267 is located upstream of the filtration system 255/257.

As shown in the FIG. 2b, the present disclosure may include a control system 280 for controlling the cleanliness of the DPF 257 similar to that shown and described with respect to FIG. 2a. Additionally, the control system 280 of FIG. 2b may be further adapted to monitor the SCR 265 and ASC 267 arrangement, and to control $NO_X$ reduction by administering the SCR reductant fluid or SCR reagent injection based on the monitored values. More specifically, the control system 280 may be adapted to signal to the SCR doser to increase injection of SCR reductant fluid or SCR reagent if $NO_X$ levels are more than a select threshold. In contrast, the control system 280 may be adapted to signal to the SCR doser to decrease injection of SCR reductant fluid or SCR reagent when $NO_X$ levels are less than a select threshold.

The control system 280 may further be adapted to control injection of SCR reductant fluid or SCR reagent based on temperature. For example, the SCR 265 and ASC 267 may have select temperature operability ranges, wherein the SCR 265 and ASC 267 may only reduce NO at certain temperatures. In this arrangement, the control system 265 may be adapted to signal the injector 263 to only operate over that temperature range. In yet another embodiment (not shown), the exhaust aftertreatment system 251 may further include an optional burner which controls the exhaust temperature. As such, the control system 280 may be further adapted to signal the burner to maintain the temperature of the exhaust gas to a temperature within the operability ranges of the SCR 265 and ASC 267.

As illustrated in FIGS. 3-9, an EGR system may be used to reduce exhaust emissions. These EGR systems may be used in conjunction with the exhaust aftertreatment systems of FIGS. 2a and 2b to further reduce exhaust emissions. Such emissions systems for a diesel locomotive engine which include both an EGR system and an exhaust aftertreatment system are described in detail with respect to FIGS. 10-11.

Figure 3:
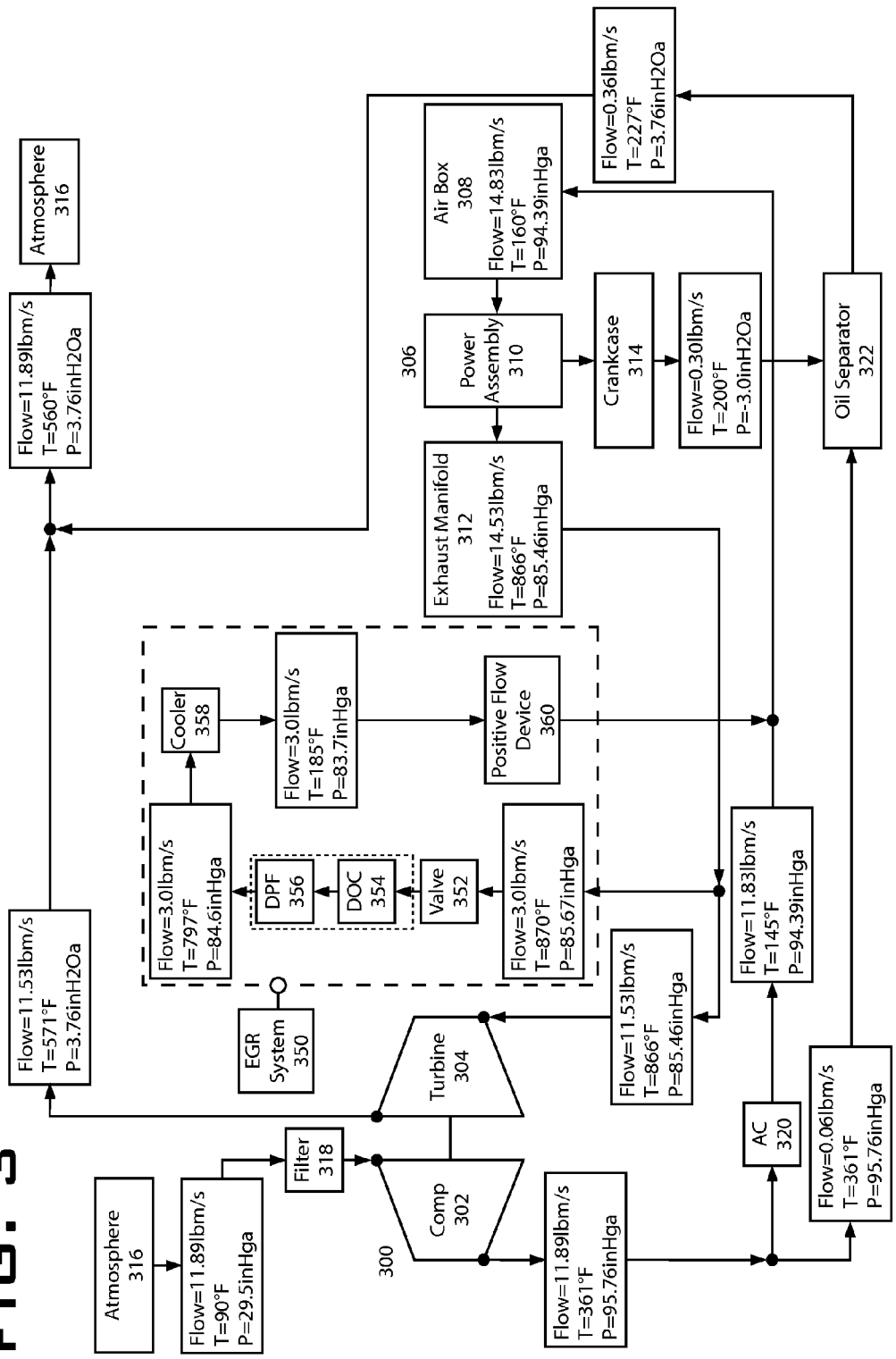
FIG. 3 is a system diagram of the two-stroke diesel engine system having an EGR system in accordance with an embodiment of the present disclosure.

As shown in FIG. 3, an EGR system 350 is illustrated which recirculates exhaust gases from the exhaust manifold 312 of the engine 306, mixes the exhaust gases with the cooled charge air of the aftercooler 320, and delivers such to the airbox 308. In this EGR system 350, only a select percentage of the exhaust gases is recirculated and mixed with the intake charge air in order to selectively reduce pollutant emissions (including $NO_X$) while achieving desired fuel efficiency. The percentage of exhaust gases to be recirculated is also dependent on the amount of exhaust gas flow needed for powering the compressor 302 of the turbocharger 300. It is desired that enough exhaust gas powers the turbine 304 of the turbocharger 300 such that an optimal amount of fresh air is transferred to the engine 306 for combustion purposes. For locomotive diesel engine applications, it is desired that less than about 35% of the total gas (including compressed fresh air from the turbocharger and recirculated exhaust gas) delivered to the airbox 308 be recirculated. This arrangement provides for pollutant emissions (including NOX) to be reduced, while achieving desired fuel efficiency.

A flow regulating device may be provided for regulating the amount of exhaust gases to be recirculated. In one embodiment, the flow regulating device is a valve 352 as illustrated in FIG. 3. Alternatively, the flow regulating device may be a positive flow device 360, wherein there is no valve (not shown) or the valve 352 may function as an on/off valve as will be discussed in greater detail below.

The select percentage of exhaust gases to be recirculated may be optionally filtered. Filtration is used to reduce the particulates that will be introduced into engine 306 during recirculation. The introduction of particulates into the engine 306 causes accelerated wear especially in uniflow two-stroke diesel engine applications. If the exhaust gases are not filtered and recirculated into the engine, the unfiltered particulates from the combustion cycle would accelerate wear of the piston rings and cylinder liner. For example, uniflow two-stroke diesel engines are especially sensitive to cylinder liner wall scuffing as hard particulates are dragged along by the piston rings the cylinder liner walls after passing through the intake ports. Oxidation and filtration may also be used to prevent fouling and wear of other EGR system components (e.g., cooler 358 and positive flow device 360) or engine system components. In FIG. 3, a diesel oxidation catalyst (DOC) 354 and a diesel particulate filter (DPF) 356 are provided for filtration purposes. The DOC uses an oxidation process to reduce the particulate matter (PM), hydrocarbons and/or carbon monoxide emissions in the exhaust gases. The DPF includes a filter to reduce PM and/or soot from the exhaust gases. The DOC/DPF arrangement may be adapted to passively regenerate and oxidize soot. Although a DOC 354 and DPF 356 are shown, other comparable filters may be used.

The filtered air is optionally cooled using cooler 358. The cooler 358 serves to decrease the recirculated exhaust gas temperature, thereby providing a denser intake charge to the engine. The decrease in recirculated exhaust gas intake temperature reduces NOX emissions and improves fuel economy. It is preferable to have cooled exhaust gas as compared to hotter exhaust gas at this point in the EGR system due to ease of deliverability and compatibility with downstream EGR system and engine components.

The cooled exhaust gas flows to a positive flow device 360 which provides for the necessary pressure increase to overcome the pressure loss within the EGR system 350 itself and overcome the adverse pressure gradient between the exhaust manifold 312 and the introduction location of the recirculated exhaust gas. Specifically, the positive flow device 360 increases the static pressure of the recirculated exhaust gas sufficient to introduce the exhaust gas upstream of the power assembly. Alternatively, the positive flow device 360 decreases the static pressure upstream of the power assembly at the introduction location sufficient to force a positive static pressure gradient between the exhaust manifold 312 and the introduction location upstream of the power assembly 310. The positive flow device 360 may be in the form of a roots blower, a venturi, centrifugal compressor, propeller, turbocharger, pump or the like. The positive flow device 360 may be internally sealed such that oil does not contaminate the exhaust gas to be recirculated.

As shown in FIG. 3, there is a positive pressure gradient between the airbox 308 (e.g., about 94.39 inHga) to the exhaust manifold 312 (e.g., about 85.46 inHga) necessary to attain the necessary levels of cylinder scavenging and mixing. In order to recirculate exhaust gas, the recirculated exhaust gas pressure is increased to at least match the aftercooler discharge pressure as well as overcome additional pressure drops through the EGR system 350. Accordingly, the exhaust gas is compressed by the positive flow device 360 and mixed with fresh air from the aftercooler 320 in order to reduce $NO_X$ emissions while achieving desired fuel economy. It is preferable that the introduction of the exhaust gas is performed in a manner which promotes mixing of recirculated exhaust gas and fresh air.

As an alternative to the valve 352 regulating the amount of exhaust gas to be recirculated as discussed above, a positive flow device 360 may instead be used to regulate the amount of exhaust gas to be recirculated. For example, the positive flow device 360 may be adapted to control the recirculation flow rate of exhaust gas air from the engine 306, through the EGR system 350, and back into the engine 306. In another example, the valve 352 may function as an on/off type valve, wherein the positive flow device 360 regulates the recirculation flow rate by adapting the circulation speed of the device. In this arrangement, by varying the speed of the positive flow device 360, a varying amount of exhaust gas may be recirculated. In yet another example, the positive flow device 360 is a positive displacement pump (e.g., a roots blower) which regulates the recirculation flow rate by adjusting its speed.

A new turbocharger 300 is provided having a higher pressure ratio than that of the prior art uniflow two-stroke diesel engine turbochargers. The new turbocharger provides for a higher compressed charge of fresh air, which is mixed with the recirculated exhaust gas from the positive flow device 360. The high pressure mixture of fresh air and exhaust gas delivered to the engine 306 provides the desired trapped mass of oxygen necessary for combustion given the low oxygen concentration of the trapped mixture of fresh air and cooled exhaust gas.

Figure 4:
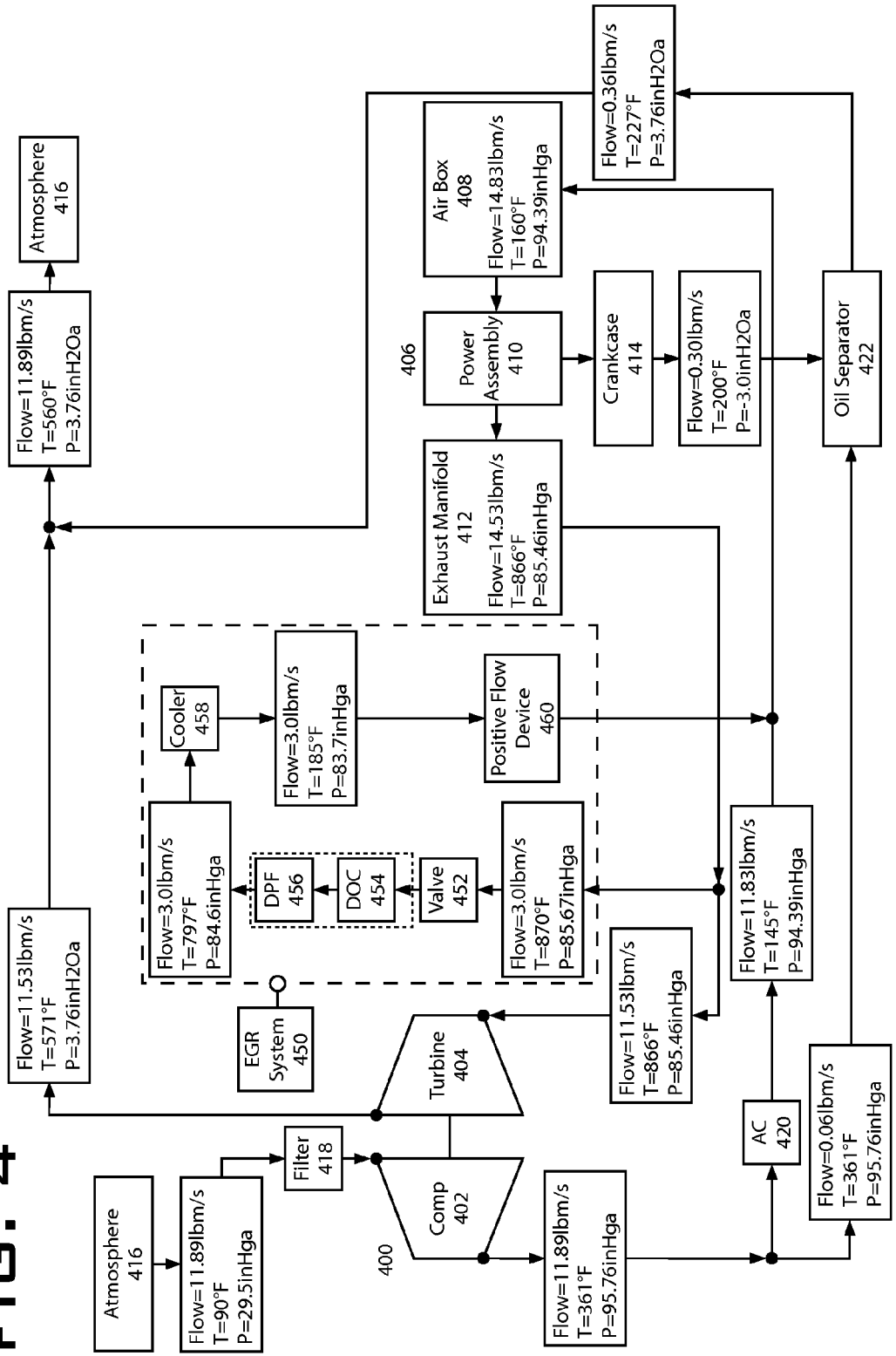
FIG. 4 is a system diagram of the two-stroke diesel engine system having an EGR system in accordance with another embodiment of the present disclosure.

As shown in an EGR system 450 embodiment of FIG. 4, recirculated exhaust gas may be alternatively introduced upstream of the aftercooler 420 and cooled thereby before being directed to the airbox 408 of the engine 406. In this embodiment, the aftercooler 420 (in addition to the cooler 458) cools the fresh charge air from the turbocharger 400 and the recirculated exhaust gas to decrease the overall charge air intake temperature of the engine 406, thereby providing a denser intake charge air to the engine 406. In another embodiment (not shown), an optional oil filter may be situated downstream of the positive flow device 460 to filter any residual oil therefrom. This arrangement prevents oil contamination in the aftercooler 420 and in the recirculated exhaust gas.

Figure 5:
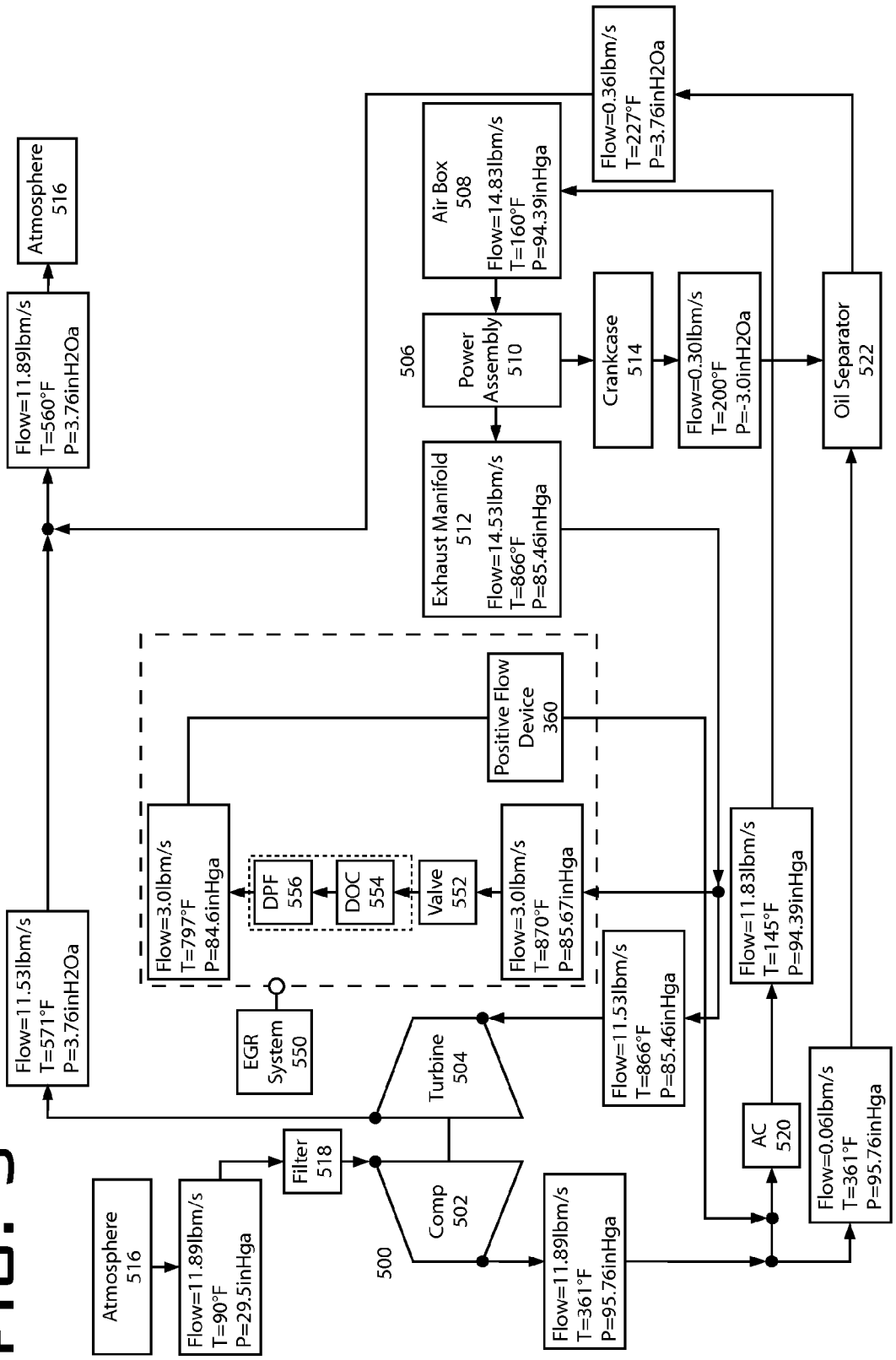
FIG. 5 is a system diagram of the two-stroke diesel engine system having an EGR system in accordance with another embodiment of the present disclosure.

As shown in an EGR system 550 embodiment of FIG. 5, the filtered air may optionally be directed to the aftercooler 520 for the same purposes without the addition of the cooler 358, 458 in FIGS. 3 and 4. In this arrangement, the cooling of the exhaust gas to be recirculated is performed solely by the aftercooler 520. The aftercooler 520 would serve to cool the fresh charge air from the turbocharger and the recirculated exhaust gas, thereby providing a denser overall intake charge air to the engine.

Figure 6:
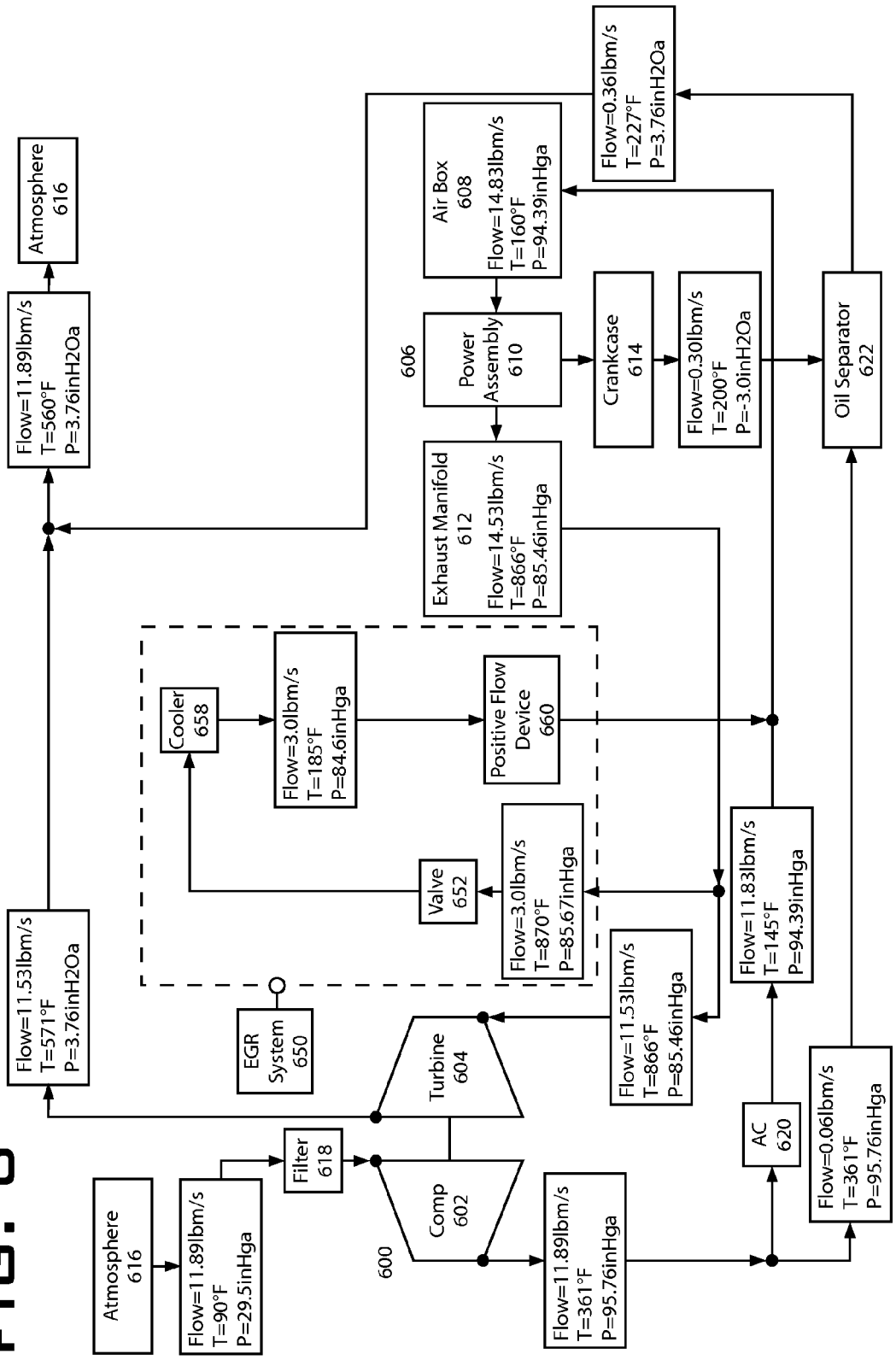
FIG. 6 is a system diagram of the two-stroke diesel engine system having an EGR system in accordance with another embodiment of the present disclosure.

As shown in FIG. 6, an EGR system 650 is illustrated which does not include the DOC/DPF filtration system of the previous embodiments.

Figure 7:
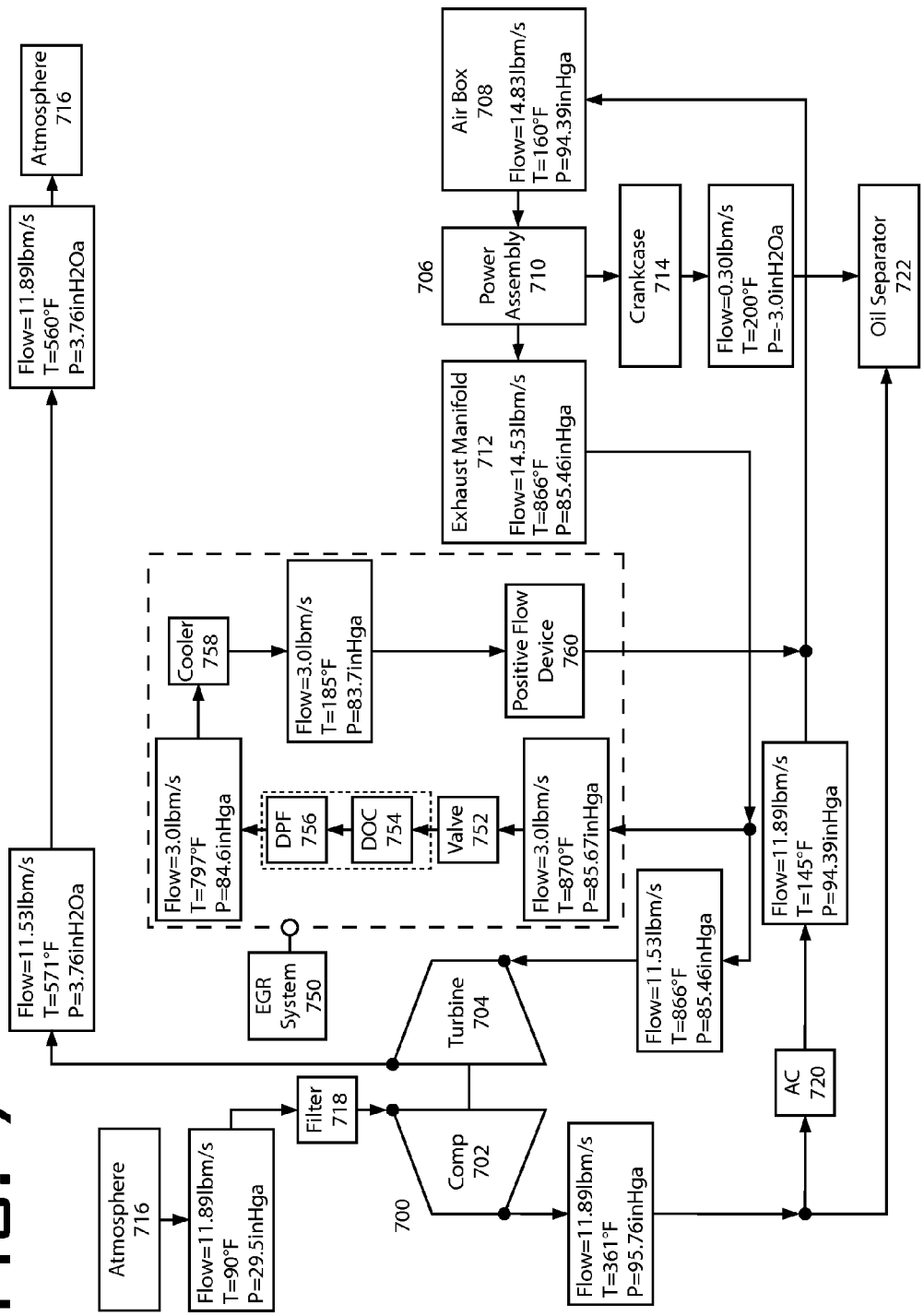
FIG. 7 is a system diagram of the two-stroke diesel engine system having an EGR system in accordance with another embodiment of the present disclosure.

As shown in FIG. 7, an EGR system 750 is illustrated, which is implemented in an engine 706 having a positive or negative crankcase ventilation, whereby the oil separator outlet is directed to the low pressure region upstream of the compressor inlet. Accordingly, the compressed air from the turbocharger 700 is not directed to an oil separator as shown in the previous embodiments.

A control system may further be provided which monitors and controls select components of any of the EGR systems of the previous embodiments, or other similar EGR systems. Specifically, the control system may be adapted to control select components of an EGR system to adaptively regulate exhaust gas recirculation based on various operating conditions of the locomotive. The control system may be in the form of a locomotive control computer, another onboard control computer or other similar control device. Various embodiments of control systems are illustrated in FIG. 8.

Figure 8:
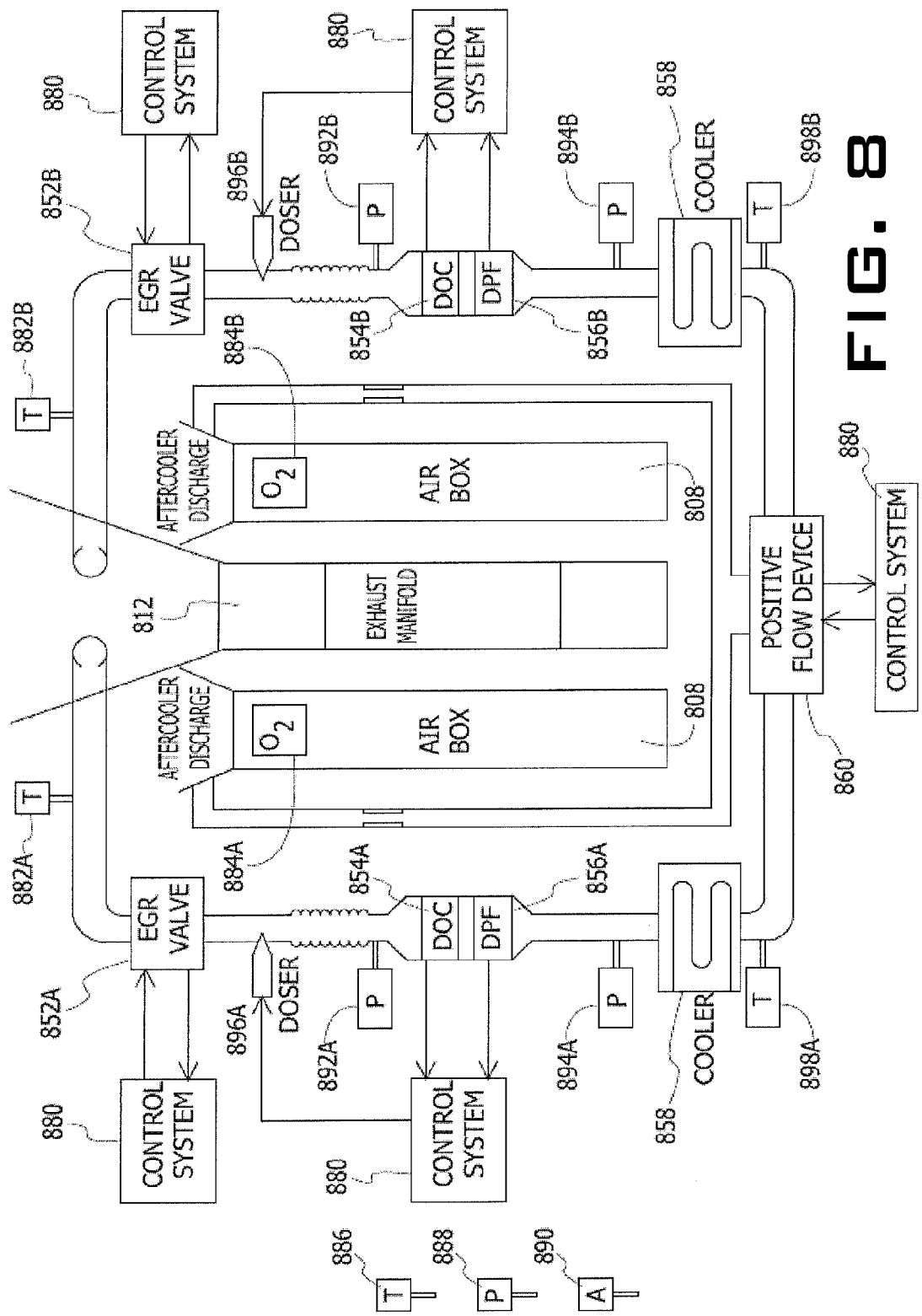
FIG. 8 is a system diagram of a control system for an EGR system for a two-stroke diesel engine in accordance with an embodiment of the present disclosure.
Figure 9C:
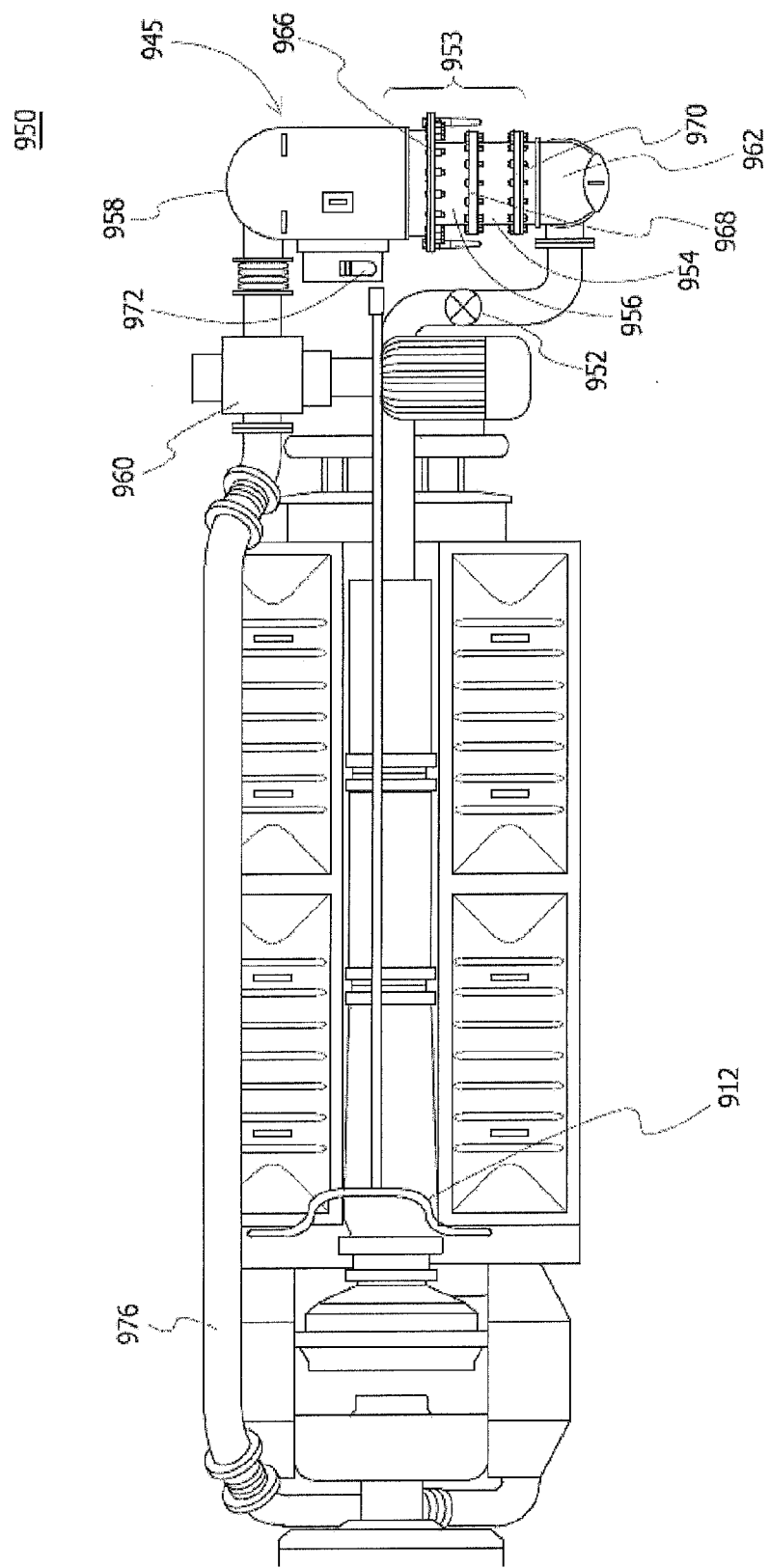
Figure 9H:
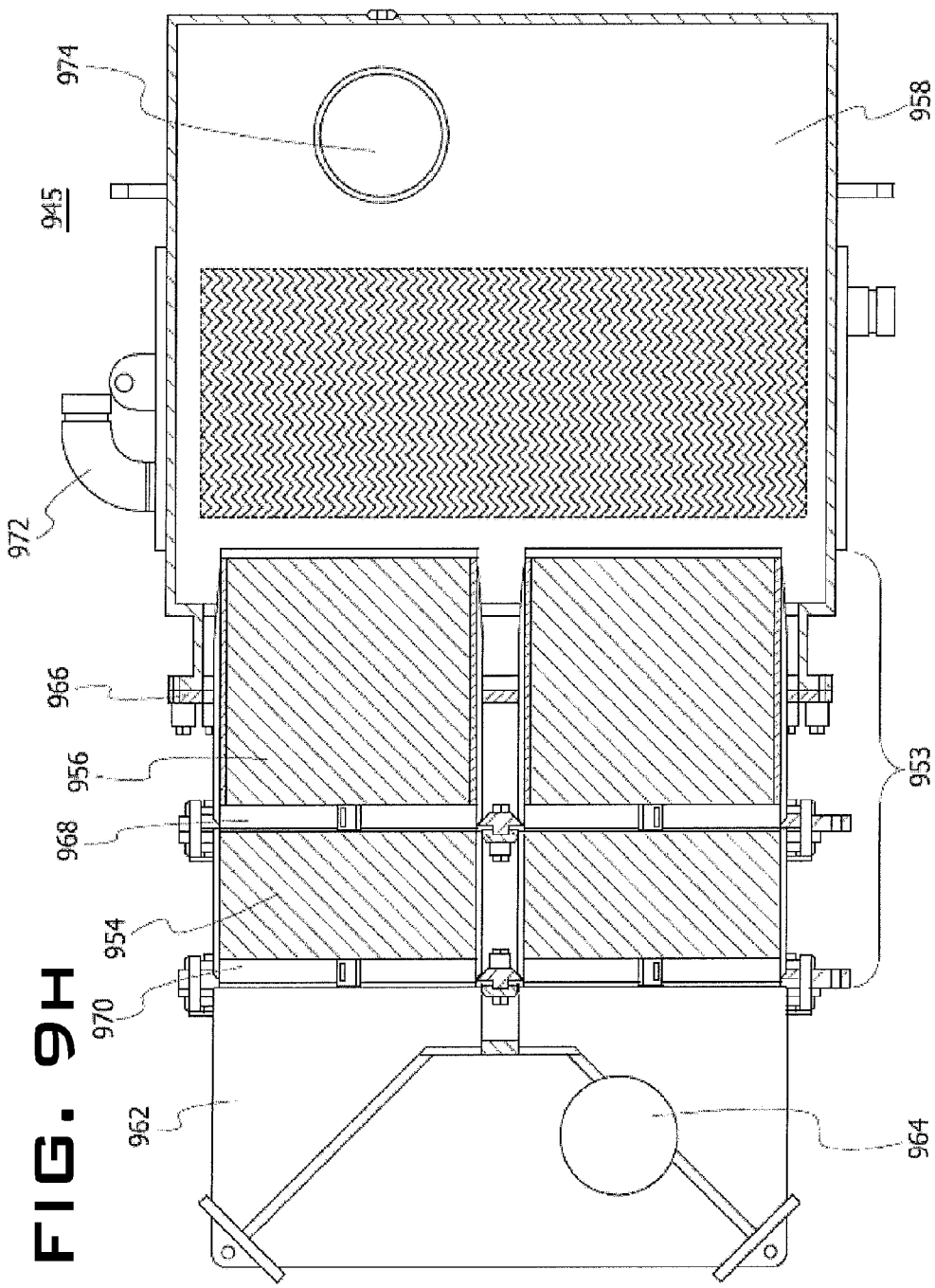
FIG. 9h is a cross sectional view of the EGR module of FIG. 9e.

In one embodiment of FIG. 8, a control system 880 monitors the temperature of the exhaust gas at the exhaust manifold using exhaust manifold temperature sensors 882*a*, 882*b*. If the exhaust gas temperature at the exhaust manifold 812 is within the normal operational temperature range of the EGR system, the control system signals the flow regulating device (e.g., valve 852*a* and 852*b* and/or positive flow device 860) to recirculate a select amount of exhaust gas through the engine. If the exhaust gas temperature falls outside of the normal operational temperature range of the EGR system, the control system 880 signals the flow regulating device (e.g., valve 852*a*, 852*b* and/or positive flow device 860) to recirculate another select amount of exhaust gas through the engine. It is preferable that if the exhaust gas temperature falls outside of the normal operational temperature range of the EGR system, the control system 880 signals the flow regulating device to lower the amount of exhaust to be recirculated through the engine. In one example, the normal operational temperature range of the EGR system is based in part on the operating temperature limits of the diesel engine. In another example, the normal operational temperature range of the EGR system is based in part on the temperatures at which the DPF 856*a*, 856*b* will passively regenerate. The control system may further be adapted to signal the flow regulating device to recirculate a select amount of exhaust gas through the engine system based in part on the operational condition of the diesel engine system within a tunnel. In one example, the normal operational temperature range of the EGR system is based in part on the operation of the locomotive in a tunnel.

In another embodiment, a control system 880 monitors the oxygen concentration in the airbox or, alternatively, the exhaust gas oxygen concentration at the exhaust manifold 812 using oxygen concentration sensors 884*a*, 884*b*. The control system 880 signals the flow regulating device (e.g., valve 852*a*, 852*b* and/or positive flow device 860) to recirculate a select amount of exhaust gas through the engine based on levels of oxygen concentration. In one example, if there is a high oxygen concentration, the control system 880 may be adapted to signal the flow regulating device to increase the amount of exhaust gas to be recirculated through the engine.

In yet another embodiment, a control system 880 monitors ambient temperature using an ambient temperature sensor 886. The control system 880 signals the flow regulating device (e.g., valve 852*a*, 852*b* and/or positive flow device 860) to recirculate a select amount of exhaust gas through the engine based on ambient temperature. In one example, if the ambient temperature is lower than a select temperature, the control system 880 may be adapted to signal the flow regulating device to increase the amount of exhaust gas to be recirculated through the engine to at least offset the higher levels of oxygen concentration in the recirculated exhaust gas at lower ambient temperatures.

In yet another embodiment, a control system 880 monitors ambient barometric pressure or altitude using an ambient barometric pressure sensor 888 or an altitude measurement device 890. The control system 880 signals the flow regulating device (e.g., valve 852*a*, 852*b* and/or positive flow device 860) to recirculate a select amount of exhaust gas through the engine based on ambient barometric pressure or altitude. In one example, if the barometric pressure is lower than a select value, the control system 880 may be adapted to signal the flow regulating device to decrease the amount of exhaust gas to be recirculated through the engine because there are lower levels of oxygen concentration in the recirculated exhaust gas at lower barometric pressures. Alternatively, if the altitude is lower than a select value, the control system 880 may be adapted to signal the flow regulating device to increase the amount of exhaust gas to be recirculated through the engine because there are higher levels of oxygen concentration in the recirculated exhaust gas at lower altitudes.

In another embodiment, a control system 880 determines and monitors the pressure differential across the DOC/DPF arrangement 854*a*, 856*a*, 854*b*, 856*b* using pressure sensors 892*a*, 892*b*, 894*a*, 894*b*. As discussed above, the DOC/DPF arrangement 854*a*, 856*a*, 854*b*, 856*b* may be adapted to passively regenerate and oxidize soot within the DPF 856*a*, 856*b*. However, the DPF 856*a*, 856*b* will accumulate ash and some soot, which must be removed in order to maintain the DPF efficiency. As ash and soot accumulates, the pressure differential across the DOC/DPF arrangement 854*a*, 856*a*, 854*b*, 856*b* increases. Accordingly, the control system 880 monitors and determines whether the DOC/DPF arrangement 854*a*, 856*a*, 854*b*, 856*b* has reached a select pressure differential at which the DPF 856*a*, 856*b* requires cleaning or replacement. In response thereto, the control system 880 may signal an indication that the DPF 856*a*, 856*b* requires cleaning or replacement. Alternatively, the control system 880 may signal the flow regulating device to lower recirculation of exhaust gas through the engine. In another embodiment, a control system 880 is shown to be coupled to a DOC/DPF doser 896*a*, 896*b*, which adds fuel onto the catalyst for the DOC/DPF arrangement 854*a*, 856*a*, 854*b*, 856*b* for active regeneration of the filter. The fuel reacts with oxygen in the presence of the catalyst which increases the temperature of the recirculated exhaust gas to promote oxidation of soot on the filter. In another embodiment (not shown), the control system may be coupled to a burner, heating element or other heating device for controlling the temperature of the recirculated exhaust gas to control oxidation of soot on the filter.

In yet another embodiment, a control system 880 measures the temperature of the exhaust gas downstream of the cooler 858 or the temperature of the coolant in the cooler 858. As shown in FIG. 8, temperature sensors 898*a*, 898*b* are provided for measuring exhaust gas temperature downstream of the cooler 858. If the exhaust gas temperature downstream of the cooler 858 or the coolant temperature is within a select temperature range, the control system 880 signals the flow regulating device (e.g., valve 852*a*, 852*b* and/or positive flow device 860) to recirculate a select amount of exhaust gas through the engine. If the exhaust gas temperature downstream of the cooler 858 or the coolant temperature falls outside of a select temperature range, the control system 880 signals the flow regulating device to recirculate another select amount of exhaust gas through the engine. In one example, the control system 880 may be adapted to monitor the coolant temperature to determine whether the conditions for condensation of the recirculated exhaust gas are present. If condensation forms, acid condensate may be introduced into the engine system. Accordingly, the control system 880 may be adapted to signal the flow regulating device to lower recirculation of exhaust gas through the engine until the conditions for condensation are no longer present.

In another embodiment, a control system 880 may be adapted to adaptively regulate flow based on the various discrete throttle positions of the locomotive in order to maximize fuel economy, reduce NOX emissions even further and maintain durability of the EGR system and engine components. For example, the control system 880 may signal the flow regulating device (e.g., valve 852a, 852b and/or positive flow device 860) to lower recirculation of exhaust gas through the engine at low idle, high idle, throttle position 1, throttle position 2 or upon application of dynamic brake. The control system 880 may be adapted to signal the flow regulating device to recirculate exhaust gas through the engine at or above throttle position 3. In one example, the control system 880 may be adapted to increase the amount of exhaust gas to be recirculated through the engine with an increase of throttle position. In yet another embodiment, the control system 880 may be adapted to increase the amount of exhaust gas to be recirculated with additional engine load. Likewise, the control system 880 may be adapted to decrease the amount of exhaust gas to be recirculated with a decreased engine load.

FIGS. 9a-h illustrate an embodiment of an EGR system 950 in accordance with the system outlined in FIG. 4 for use with a two-stroke, 12-cylinder diesel engine system 101 in a locomotive 103. The EGR system 950 is sized and shaped to fit within limited length, width, and height constraints of a locomotive 103. As shown herein, the EGR system 950 is installed within the same general framework of traditional modern diesel engine locomotives. Specifically, the EGR system 950 is generally located in the limited space available between the exhaust manifold 912 of a locomotive engine and the locomotive radiators 980. In this embodiment, the EGR system 950 is shown located generally above the general location of the equipment rack 982. Also, a 12-cylinder locomotive diesel engine may be used instead of a 16-cylinder locomotive diesel engine in order to provide for more space. In an alternative embodiment (not shown), the EGR system 950 may be housed in the locomotive body near the inertial filter.

Generally, the EGR system 950 includes a DOC, DPF and cooler, which are packaged in an integrated EGR module 945. The EGR system 950 further includes a positive flow device 960 interconnected with the EGR module 945. The EGR system 950 receives exhaust gases from the exhaust manifold 912 of the engine 906. A valve 952 is provided between the exhaust manifold 912 and the integrated EGR module 945. The EGR module 945 processes the exhaust gases therein. The positive flow device 960 compresses the processed exhaust gas to be recirculated and introduces such upstream of the aftercooler 920 by mixing the recirculated exhaust gases with the fresh charge air from the turbocharger 900, and delivers the mixture of fresh charge air and recirculated exhaust gas to the airbox 908, as fully discussed with respect to the embodiment of FIG. 4. In this system, only a select percentage of the exhaust gases is recirculated and mixed with the intake charge air in order to selectively reduce pollutant emissions (including NOX) while achieving desired fuel efficiency. Although the EGR system 950 is an implementation of the system embodiment of FIG. 4, it may be adapted to be an implementation of any of the other previous EGR system embodiments discussed herein. For example, instead of introducing the recirculated exhaust gas upstream of the aftercooler, as described with respect to the embodiments of FIGS. 4 and 9, the recirculated exhaust gas may be introduced downstream of the aftercooler as discussed with respect to FIG. 3.

The integrated EGR module 945 includes a section 962 having an inlet 964 for receiving exhaust gases from the exhaust manifold 912. Specifically, the inlet section 962 of the EGR module 945 is interconnected with the exhaust manifold 912 of the engine 906. A valve 952 is provided between the exhaust manifold 912 and the inlet section 962 of the EGR module 945. In one example, the valve 952 is adaptable for determining the amount of exhaust gases to be recirculated through the engine 906. In another example, the valve 953 may act as an on/off valve for determining whether gases are to be recirculated through the engine 906.

Having received exhaust gas, the inlet section 962 of the EGR module 945 directs exhaust gases into a section which houses at least one diesel oxidation catalyst/diesel particulate filter (DOC/DPF) arrangement 953. Each DOC 954 uses an oxidation process to reduce the particulate matter, hydrocarbons and carbon monoxide emissions in the exhaust gases. Each DPF 956 includes a filter to reduce diesel particulate matter (PM) or soot from the exhaust gases. Oxidation and filtration is specifically used in this embodiment to reduce the particulate matter that will be introduced into engine 906 during recirculation. The introduction of particulates into the engine 906 causes accelerated wear especially in uniflow two-stroke diesel engine applications. Oxidation and filtration may also be used to prevent fouling and wear of other EGR system components (e.g., cooler 958 and positive flow device 960) or engine system components.

The DOC/DPF arrangement 953 is designed, sized and shaped such that they effectively reduce particulate matter under the operating parameters of the EGR system 950, fit within the limited size constraints of the locomotive 103, have a reasonable pressure drop across their substrates, and have a manageable service interval.

It is desirable that the DOC/DPF arrangement 953 reduces the PM in the exhaust gas by over 90% under the operating parameters of the EGR system 950. Specifically, the composition of the substrates and coatings thereon are chosen of the DOC/DPF arrangement 953 to efficiently reduce particulate matter. In one example of a 12-cylinder uniflow scavenged two-stroke diesel engine at about 3200 bhp with less than 20% exhaust gas being recirculated at full load, the DOC/DPF arrangement 953 is selected to manage and operate a mass flow of exhaust gas of from about 1.5 to about 2.5 lbm/s, having an intake temperature ranging from about 600° F. to about 1050° F., and an intake pressure of about 80 inHga to about 110 inHga. It is further preferable that the DOC/DPF arrangement 953 can handle a volumetric flow rate across both the DOC/DPF from about 1000 CFM to about 1300 CFM. Furthermore, the DOC/DPF arrangement 953 is further designed to endure an ambient temperature range of about −40° C. to about 125° C.

The DOC/DPF arrangement 953 is generally packaged such that it fits within the size constraints of the locomotive 103. As shown in this embodiment, each DOC 954 and DPF 956 is packaged in a cylindrical housing similar to those commonly used in the trucking industry. Each DOC 954 and DPF 956 has a diameter of about 12 inches. The length of each DOC 954 is about 6 inches, whereas the length of each DPF 956 is about 13 inches. The DOC 954 and DPF 946 are integrated within the EGR module 945 such that they are able to fit within the size constraints of the locomotive.

It is further desirable that the DOC/DPF arrangement 953 is selected to have a reasonable pressure drop across their substrates. As discussed above, it is preferable that the exhaust gas is introduced into a region of higher pressure. Accordingly, it is desirable to minimize the pressure drop across the DOC/DPF arrangement 953. In one embodiment, it is desirable for the pressure drop across both substrates to be less than about 20 in $H_2O$.

Finally, it is desirable that the DOC/DPF arrangement 953 has a manageable service life. The DOC/DPF arrangement 953 accumulates ash and some soot, which is preferably discarded in order to maintain the efficiency of the DOC 954 and the DPF 956. In one example, the service interval for cleaning of the DOC/DPF arrangement 953 may be selected at about 6 months. As shown in the embodiments, each DOC 954 and DPF 956 are housed in separate but adjoining sections of the EGR module 945 such that they are removable for cleaning and replacement. For maintenance, the DOC/DPF arrangement 953 includes a flange 966 for mounting the DOC/DPF arrangement 953 together with the inlet section 962 of the EGR module 945 to the cooler 958. The fasteners associated with the mounting flange 966 of the DOC/DPF arrangement 953 may be removed such that the DOC/DPF arrangement 953 together with the inlet section 962 of the EGR module 945 may be removed from the cooler 958 and the locomotive. Thereafter, the inlet section 962, the DOC 954, and the DPF 956 may be selectively disassembled for service via flanges 968, 970. In order to facilitate serviceability, the fasteners for flanges 968, 970 are offset from the DOC/DPF arrangement 953 mounting flange 966. Accordingly, the DOC/DPF arrangement 953 together with the inlet section 962 may be removed via its mounting flange 966 without first disassembling each individual section.

In order to meet the operational and maintainability requirements of the EGR system 950, a plurality of DOCs and DPFs are paired in parallel paths. For example, as shown, two DOC/DPC arrangement pairs are shown in parallel in this embodiment in order to accommodate the flow and pressure drop requirements of the EGR system 950. Moreover, the DOC/DPF arrangement pairs in parallel provide for reasonable room for accumulation of ash and soot therein. Nevertheless, more or less DOC/DPF arrangement pairs may be placed in a similar parallel arrangement in order to meet the operational and maintainability requirements of the EGR system 950.

The integrated EGR module 945 further includes a cooler 958 interconnected to the DOC/DPF arrangement 953. The cooler 958 decreases the filtered exhaust gas temperature, thereby providing a denser intake charge to the engine 906. In one example of a cooler 958 for a 12-cylinder uniflow scavenged two-stroke diesel engine at about 3200 bhp with less than 20% exhaust gas being recirculated at full load, each DPF 956 extends into the cooler 958 and provides filtered exhaust gas at a mass flow of about 1.5 lbm/s to about 2.5 lbm/s; a pressure of about 82 inHga to about 110 inHga; and a density of about 0.075 lbm/ft$^3$ to about 0.15 lbm/ft$^3$. It is desirable that the cooler 958 reduces the temperature of the filtered exhaust gas from a range of about 600° F.-1250° F. to a range of about 200° F.-250° F. at an inlet volumetric flow rate of about 1050 CFM to about 1300 CFM. The source of the coolant for the cooler 958 may be the water jacket loop of the engine, having a coolant flow rate of about 160 gpm to about 190 gpm via coolant inlet 972. It is further desirable that the cooler 958 maintains a reasonable pressure drop therein. As discussed above, the exhaust gas is introduced into a region of higher pressure. Accordingly, it is desirable to minimize the pressure drop within the cooler 958. In one embodiment, it is desirable for the pressure drop across the cooler to be from about 3 in $H_2O$ to about 6 in $H_2O$.

The cooler 958 is generally packaged such that it fits within the size constraints of the locomotive 103. As shown in this embodiment, the cooler 958 is integrated with the DOC/DPF arrangement 953. The cooler 958 has a frontal area of about 25 inches by 16 inches, and a depth of about 16 inches.

The EGR module 945 is connected to a positive flow device 960 via the outlet 974 from the cooler 958. The positive flow device 960 regulates the amount of cooled, filtered exhaust gas to be recirculated and introduced into the engine 906 at the aftercooler 920 upstream of its core via ducts 976. Specifically, the positive flow device 960 is illustrated as a variable speed roots style blower, which regulates the recirculation flow rate by adapting the circulation speed of the device through its inverter drive system. Specifically, by varying the speed of the positive flow device 960, a varying amount of exhaust gas may be recirculated. Other suitable positive flow devices may be implemented in order to similarly regulate the amount of exhaust gases to be recirculated.

Figure 10:
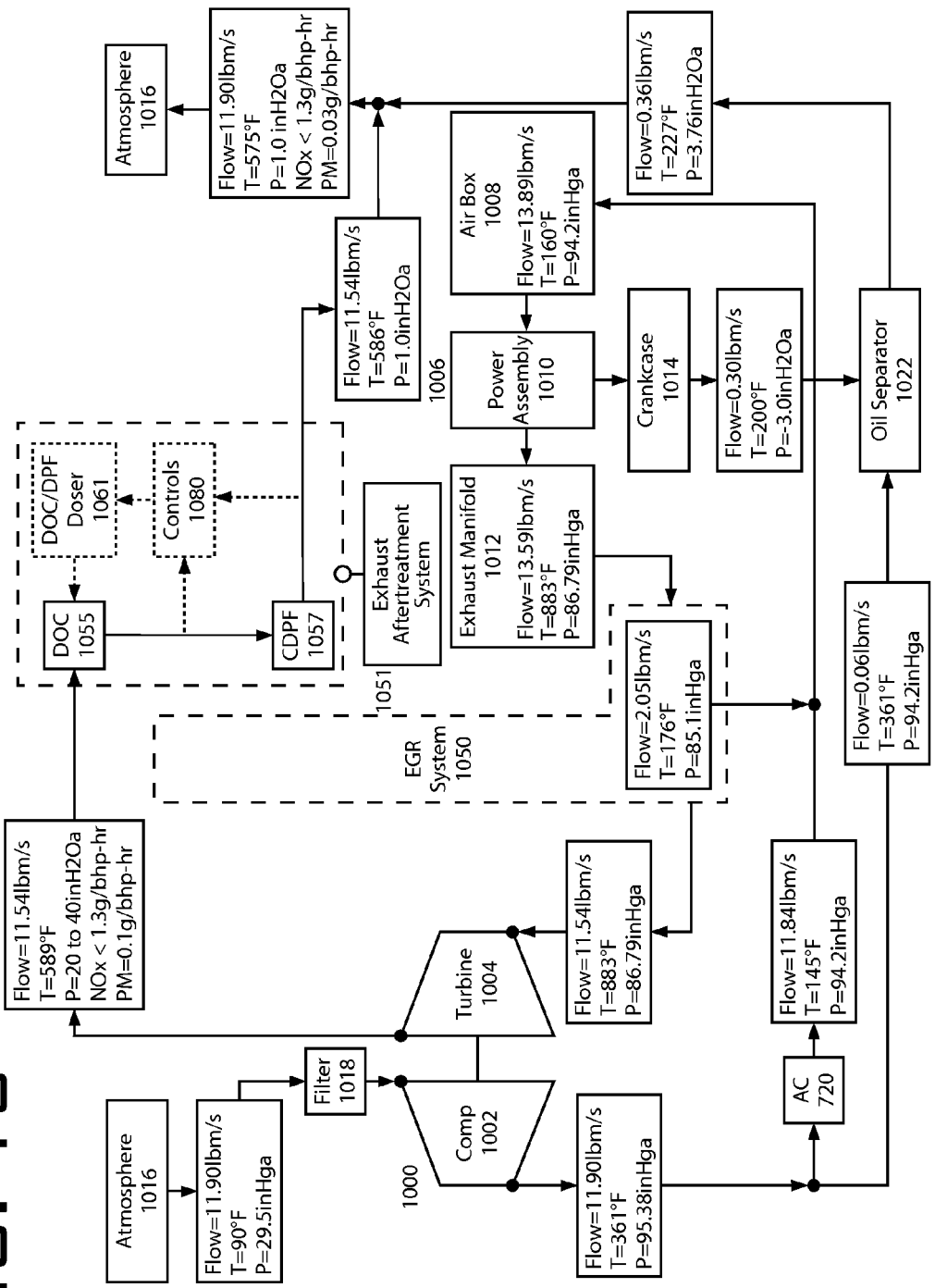
FIG. 10 is a system diagram of a two-stroke diesel engine having an exhaust aftertreatment system and an EGR system.

As shown in FIG. 10, an exhaust aftertreatment system 1051 similar to that shown and described with respect to FIG. 2a may be used in conjunction with an EGR system to reduce exhaust emissions. The EGR system 1050 may be similar to those shown and described with respect to any of FIGS. 3-9. Specifically, the exhaust aftertreatment system 1051 may be adapted to reduce particulate matter (PM), hydrocarbons and/or carbon monoxide emissions. In this particular arrangement, the exhaust aftertreatment system 1051 further includes a generally includes a filtration system 1055/1057 similar to that shown and described with respect to FIG. 2a. More specifically, the exhaust aftertreatment system 1051 includes a diesel oxidation catalyst (DOC) 1055, a diesel particulate filter (DPF) 1057, a control system (for filtration monitoring and/or control) 1080 and DOC/DPF doser 1061 similar to that shown and described with respect to FIG. 2a.

Figure 11:
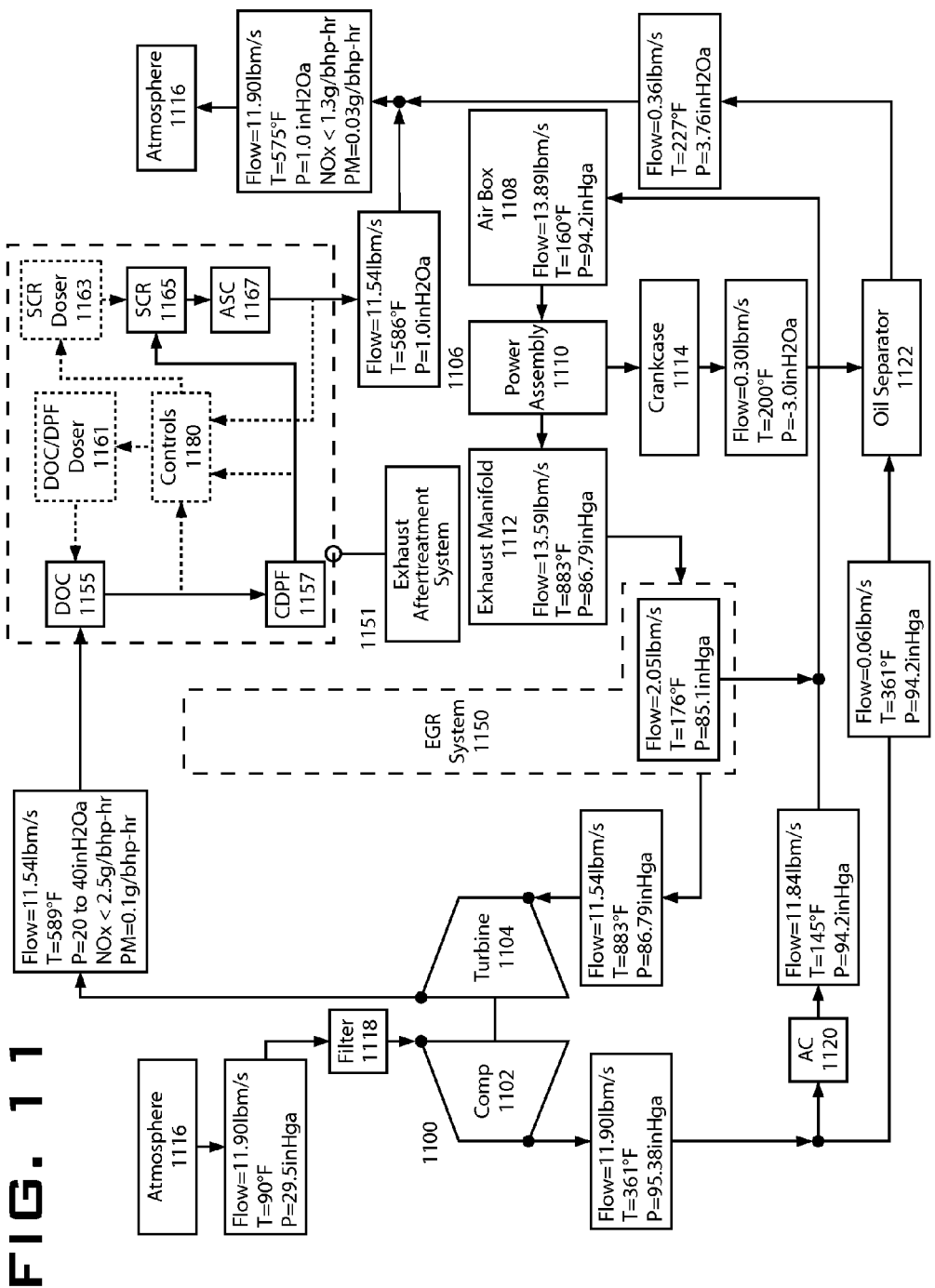
FIG. 11 is a system diagram of a two-stroke diesel engine having an EGR system and an exhaust aftertreatment system including a selective catalytic reduction catalyst and ammonia slip catalyst.

As shown in FIG. 11, an exhaust aftertreatment system 1151 similar to that shown and described with respect to FIG. 2b may be used in conjunction with an EGR system to reduce exhaust emissions. The EGR system 1150 may be similar to those shown and described with respect to any of FIGS. 3-9. Specifically, the exhaust aftertreatment system 1151 may be adapted to reduce $NO_X$ in addition to particulate matter (PM), hydrocarbons and/or carbon monoxide emissions. In this particular arrangement, the exhaust aftertreatment system 1151 generally includes a filtration system and SCR system similar to that shown and described with respect to FIG. 2b. More specifically, the exhaust aftertreatment system 1151 includes a diesel oxidation catalyst (DOC) 1155, a diesel particulate filter (DPF) 1157, a control system (for filtration and SCR monitoring and/or control) 1180 and DOC/DPF doser 1161 similar to that shown and described with respect to FIG. 2a. Additionally, the exhaust aftertreatment system 1151 of FIG. 11 further includes a selective catalytic reduction (SCR) catalyst 1165, ammonia slip catalyst (ASC) 1167, and an SCR doser 1163 adapted to lower $NO_X$ emissions of the engine 1106.

FIGS. 12a-l illustrate an embodiment of an exhaust aftertreatment system 1251 in accordance with the system outlined in FIGS. 2b and 11 for use with a locomotive 103. The exhaust aftertreatment system 1251 is adapted to reduce $NO_X$ in addition to particulate matter (PM), hydrocarbons and/or carbon monoxide emissions. In this particular arrangement, the exhaust aftertreatment system 1251 generally includes a plurality of filtration systems 1255/1257, each being situated inline with a $NO_X$ reduction system 1265/1267.

The exhaust aftertreatment system 1251 includes a turbocharger mixing manifold 1211 for receiving exhaust expelled from the engine 1206 and, specifically, the turbocharger stack. DOC/DPF dosers (e.g., hydrocarbon injectors) may be provided to add a select amount of fuel into the exhaust stream at the turbocharger mixing manifold 1211. The DOC/DPF dosers may be arranged with respect to the turbocharger mixing manifold 1211 to facilitate delivery of fuel to the exhaust contained within the turbocharger mixing manifold 1211 and promote mixing therein. The DOC/DPF dosers may be situated in a common rail or single line system. The operation of the DOC/DPF doser may be controlled by a control system as described with respect to the embodiment described in FIG. 2b. The fuel reacts with oxygen in the presence of the catalyst, which increases the temperature of the exhaust gas to promote oxidation of soot on the filter of the DOC/DPF arrangement 1255/1257. The turbocharger mixing manifold 1211 may further be sized and shaped to serve as a mixing chamber, promote mixing of fuel and exhaust, and uniformly distribute this mixture to the remainder of the exhaust aftertreatment system 1251. In yet another embodiment (not shown), mixing elements may be included to promote mixing in the turbocharger mixing manifold 1211 or elsewhere upstream of the DOC/DPF arrangement 1255/1257.

As previously noted, exhaust gas leaving a typical diesel engine turbocharger flows through a common aftertreatment system burner thereby increasing pressure loss and requiring fuel to mix with the entire exhaust stream. By contrast, the alternative approach described by the present arrangement limits the percentage of exhaust flow into the auxiliary burner in order to minimize pressure losses leading into the aftertreatment system. Attentive mixing of the burning gas then allows the entire exhaust stream leaving the turbocharger to increase the temperature evenly prior to entering the aftertreatment system components.

Accordingly, and in yet another embodiment, a burner, heating element or other heating device may be used to control the temperature of the exhaust at the turbocharger mixing manifold 1211 to control oxidation of soot on the filter of the DOC/DPF arrangement 1255/1257. For example, as shown in FIGS. 12b-12e, exhaust burner lines 1259 from the engine upstream of the turbocharger (e.g., from the engine exhaust manifold 1212) are shown in communication with the turbocharger mixing manifold 1211 to direct a select amount of exhaust directly from the engine (e.g., from the engine exhaust manifold 1212) to a burner 1293, heating element or other heating device, through an exhaust gas inlet and then to the exhaust aftertreatment system 1251 via the turbocharger mixing manifold 1211 through an exhaust gas outlet. The select amount of exhaust is heated to a select temperature and introduced into the exhaust stream at the turbocharger mixing manifold 1211. The select amount of exhaust is preferably introduced upstream of the location of the DOC/DPF doser. The heated exhaust is mixed with the exhaust in the turbocharger mixing manifold 1211 to achieve a select temperature at which oxidation of soot on the filter of the DOC/DPF arrangement 1255/1257 is promoted. The operation of the burner, heating element or other heating device may be controlled by a control system as described with respect to the embodiment described in FIG. 2b.

Moreover, the system may include a control system adapted to control temperature of exhaust gas at the DPF 1257 to promote oxidation of the filter. As discussed above, the DOC/DPF arrangement 1255/1257 may be adapted to passively regenerate and oxidize soot within the DPF 1257. However, the DPF 1257 will accumulate ash and some soot, which must be removed in order to maintain the DPF efficiency. Accordingly, the control system monitors and determines whether exhaust gas at the DOC/DPF arrangement 1255/1257 has reached a select temperature, at which oxidation may occur at the DPF 1257. Specifically the control system 280 monitors the temperature of exhaust gas at either the DOC 1255 inlet or DOC 1255 outlet using temperature sensors. It is specifically critical for the exhaust temperature to be above the select threshold at the DPF 1257 such that soot therein may be oxidized. Because exhaust temperature may decrease as exhaust flows through the DOC 1255, it is preferable that the temperature sensor be situated at the DOC 1255 outlet to provide a more accurate indication of the exhaust temperature at the DPF 1257.

If cleaning is desired and the exhaust temperature is not within the oxidation temperature range (e.g., between about 240° C. and about 280° C., and preferably about 280° C.), the control system 280 may signal the burner to heat a select volume of exhaust entering the exhaust aftertreatment system from the exhaust manifold 1212. The select amount of exhaust is heated to a select temperature and introduced into the exhaust stream at the turbocharger mixing manifold 1211. The heated exhaust is mixed with the exhaust in the turbocharger mixing manifold 1211 to achieve a temperature of between about 240° C. and about 280° C., and preferably about 280° C., at which oxidation of soot on the filter of the DOC/DPF arrangement 1255/1257 is promoted. As discussed above, the operation of the burner 1293 may be controlled by the control system.

Figure 12A:
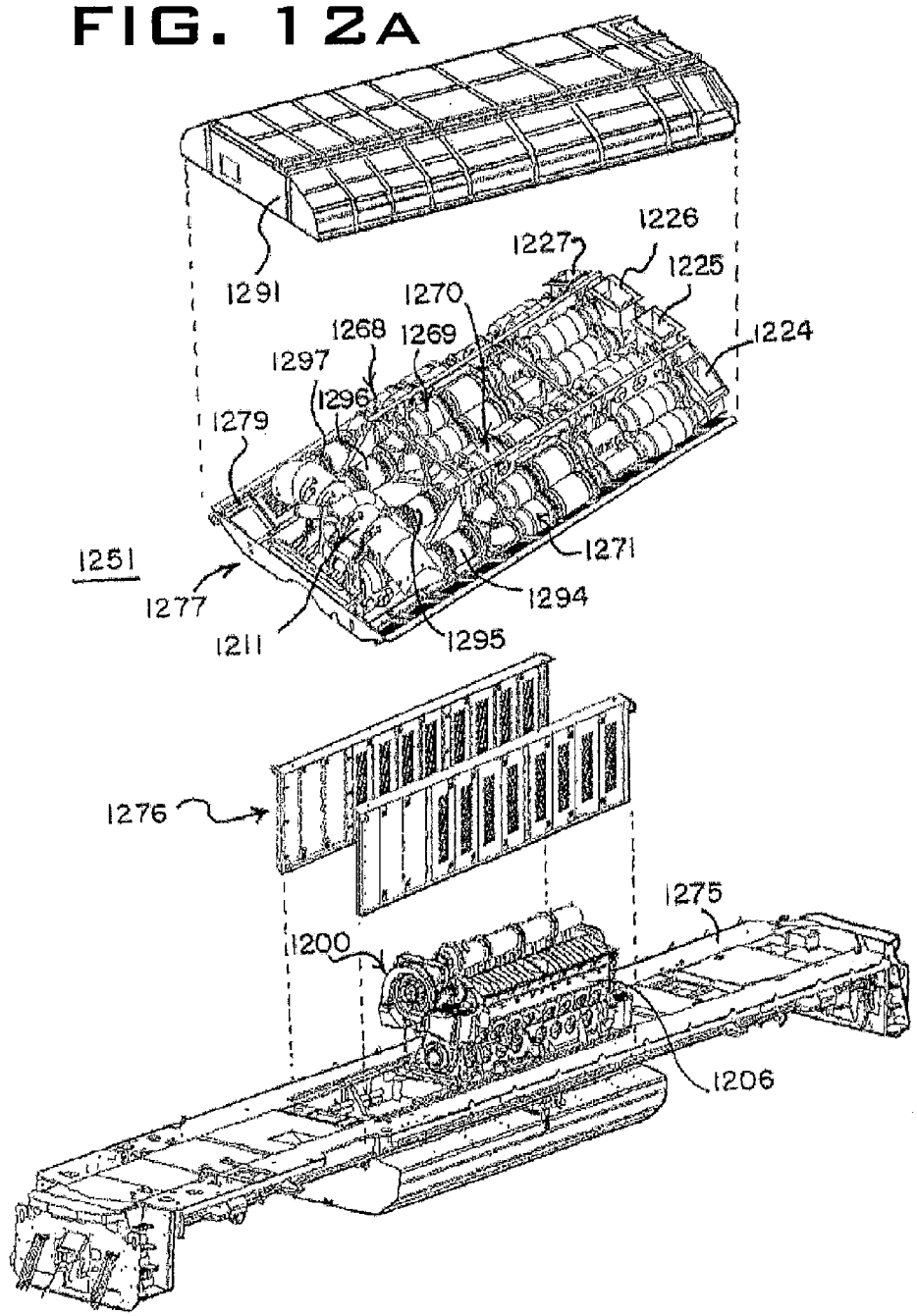
FIG. 12a is an exploded perspective view of an embodiment of an exhaust aftertreatment system in accordance with the present system.
Figure 12B:
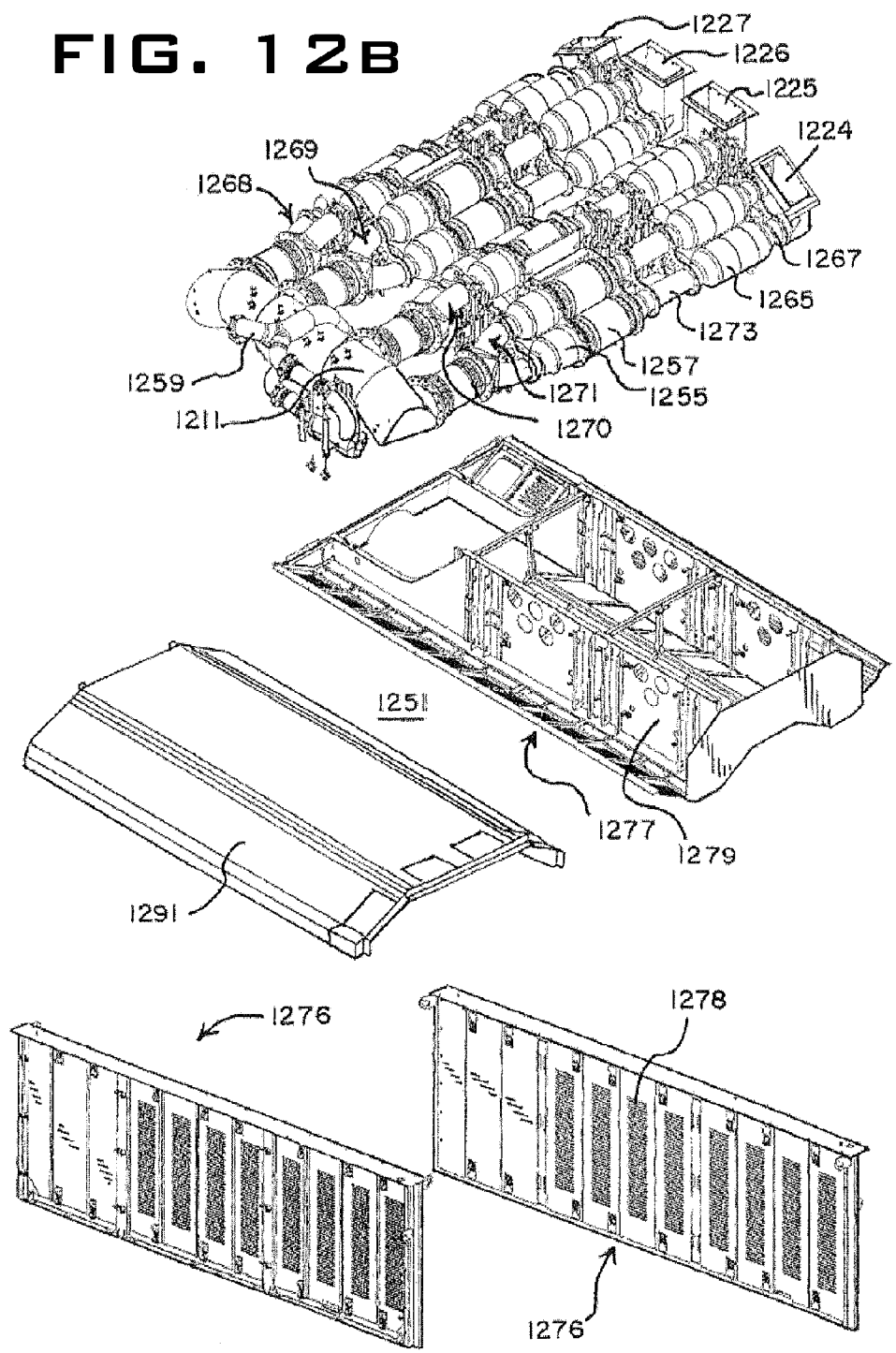
Figure 12C:
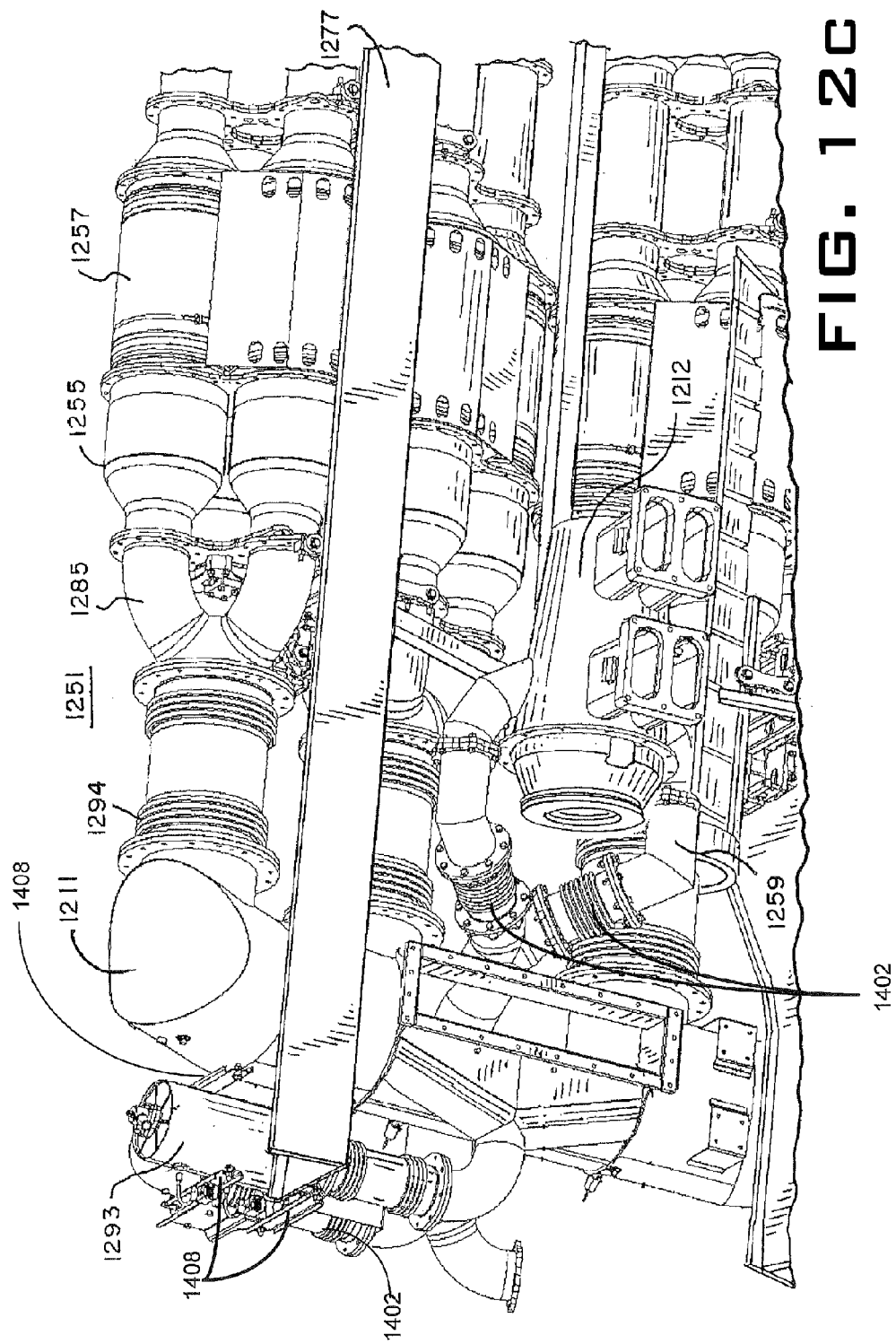
Figure 12D:
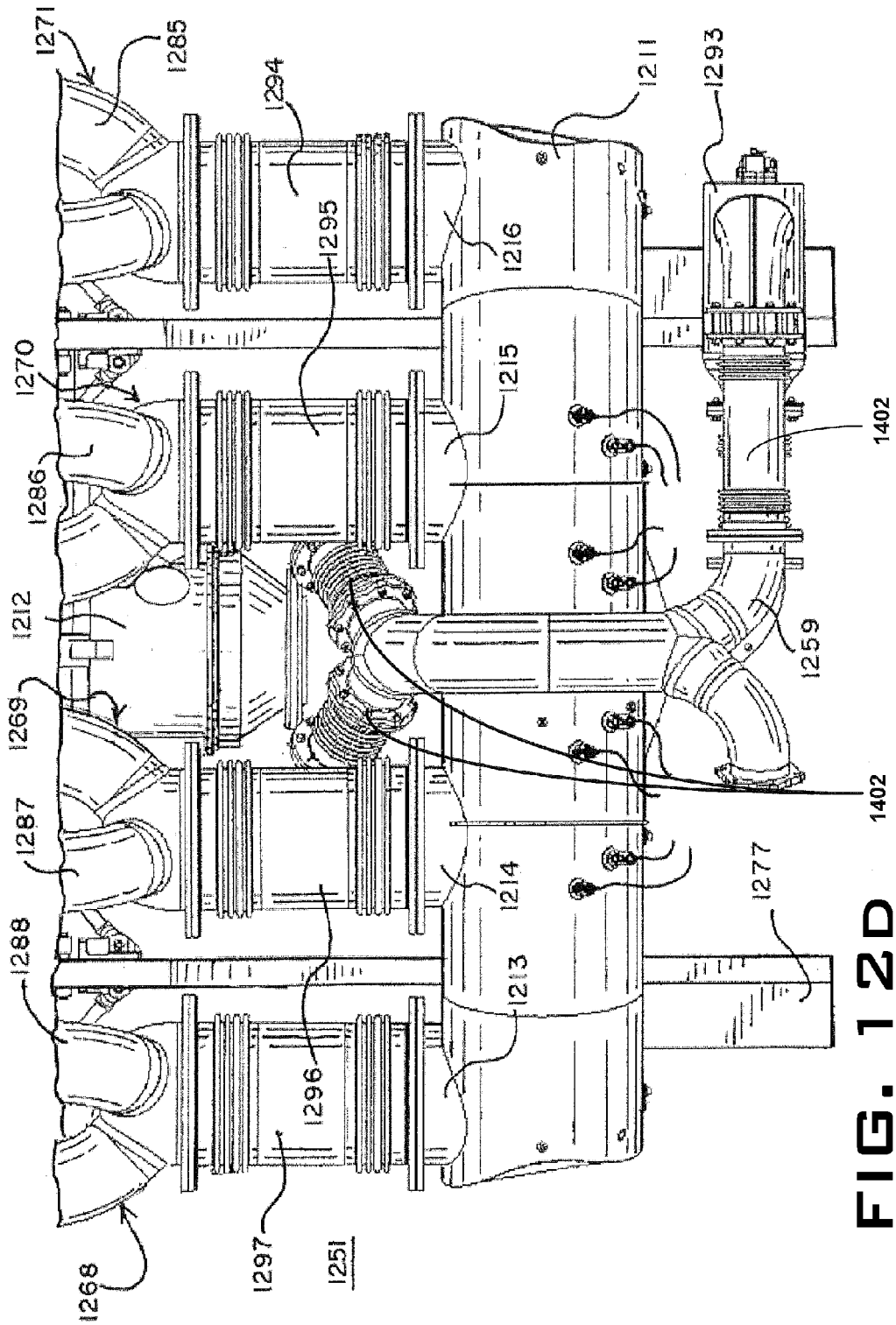
Figure 12F:
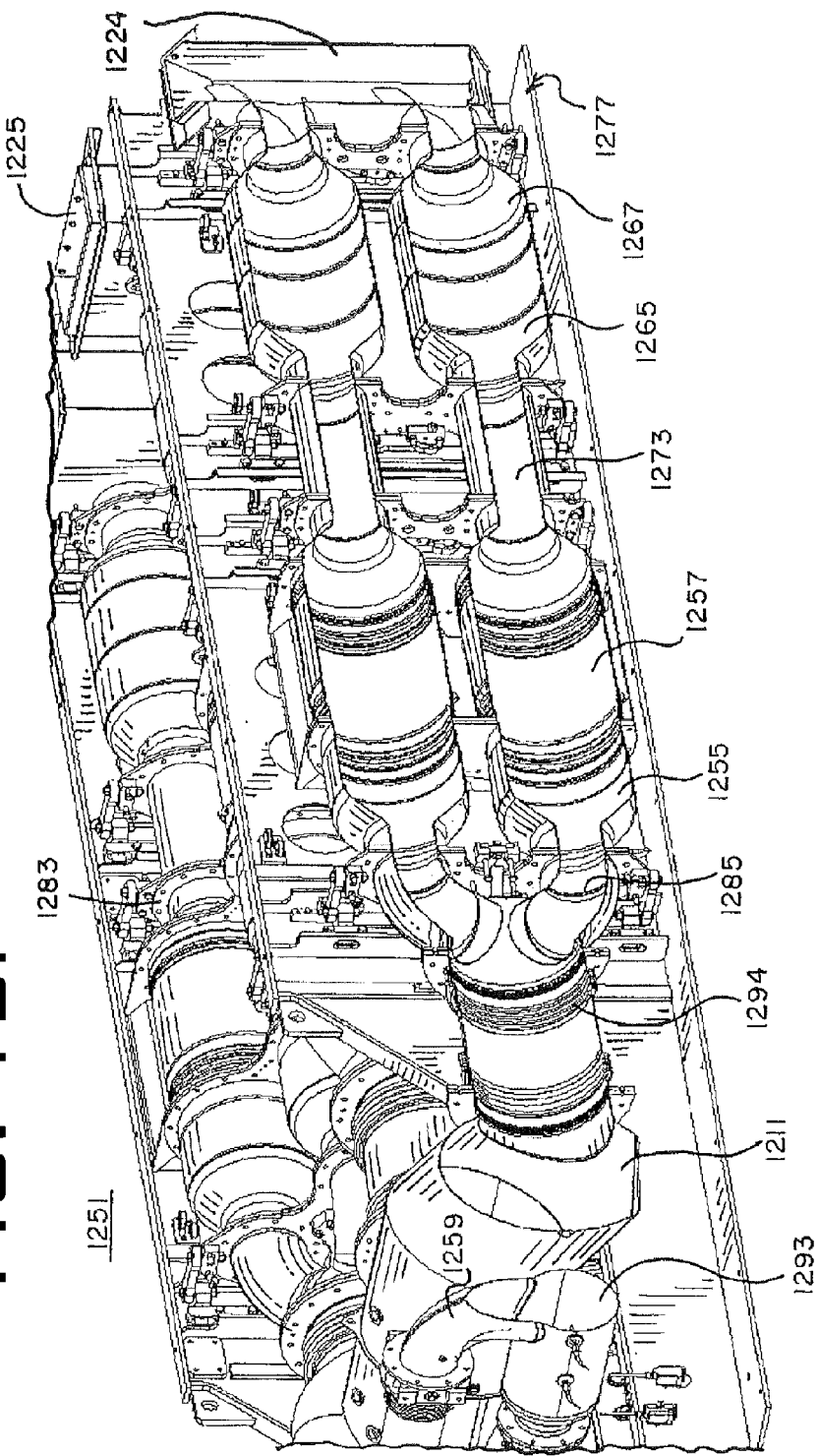
FIG. 12f is a side view of the embodiment of the exhaust aftertreatment system of FIG. 12a, showing the discrete aftertreatment line assemblies thereof.
Figure 12G:
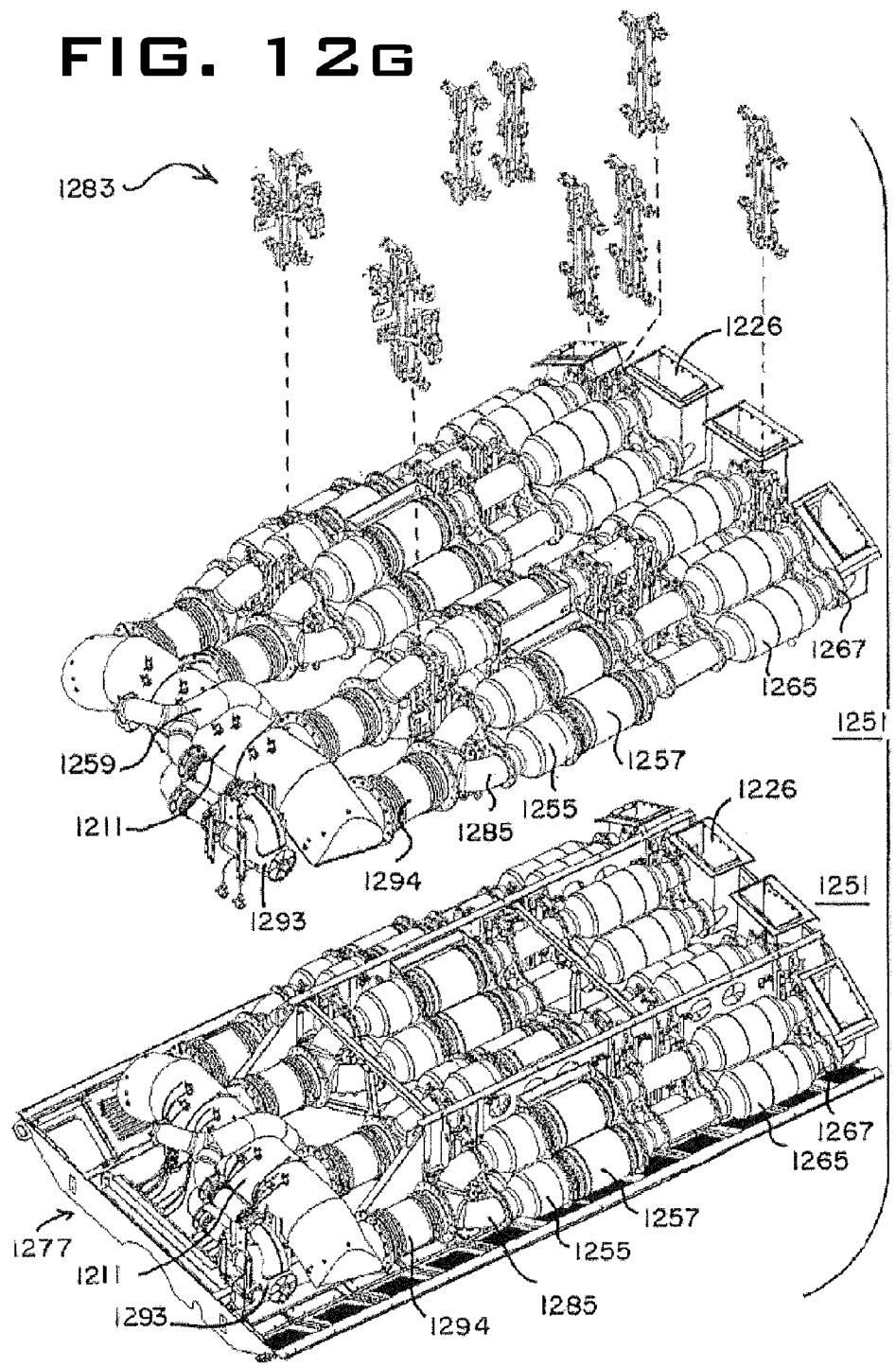
FIG. 12g is an exploded perspective view of an embodiment of the exhaust aftertreatment system of FIG. 12a including a connection system.

More particularly, and referring first to FIGS. 12c and 12d, exhaust energy (in the form of heated combustion products) in the engine exhaust manifold 1212 bypasses the turbocharger through a valve and then flows into a burner 1293 via preferably flexible couplings 1402 through primary burner lines 1259 sized to meter the percentage of exhaust gas. Referring now to FIG. 12e, fuel added to the stream ignites in the burner 1293 and leaves through another flexible coupling 1402 and through secondary burner lines 1404 and into the premixing duct 1406 before entraining with the primary exhaust downstream of the turbocharger.

Additionally, the burner body 1293 preferably mounts to an isolation structure (i.e., the support structure 1277) via pivoting links or flexible mounts 1408. The isolation mechanism remains part of a larger primary locomotive structure and is independent of the engine thermal input from the engine exhaust. Sensitive fuel metering injectors and monitoring sensors that mount to the burner benefit from this isolation arrangement as do electrical wires and fuel lines. Not only does isolated positioning of the burner assemblage allow for relative detachment from engine vibration and heat, but it further allows ease of maintenance and simplifies disassembly for servicing through removal of the entire module without disturbing the main exhaust manifold.

Therefore, the burner mechanism described herein for a locomotive exhaust aftertreatment system provides an auxiliary means to increase the temperature of the primary exhaust stream leaving the turbocharger to facilitate maintenance activity and interchangeability with other like devices.

The pressure and mass flow of exhaust exiting the turbocharger stack is generally non-uniform and varies based on throttle position of the locomotive. However, it is preferable that the pressure and mass flow of exhaust to each inline filtration 1255/1257 and $NO_X$ reduction system 1265/1267 be uniform. Accordingly, the turbocharger mixing manifold 1211 may further be sized and shaped to stabilize the exhaust airflow and promote a uniform exhaust airflow to each inline filtration 1255/1257 and $NO_X$ reduction system 1265/167. Accordingly, as shown in Figure this embodiment, the turbocharger mixing manifold 1211 is sized and shaped such that the exhaust generally enters a volume (or static box), which is greater than the turbocharger exit. This larger volume stabilizes (or slows) the exhaust airflow and allows it to homogenize such that it may then uniformly enter into to the various discrete aftertreatment line assemblies 1268-1271 of the filtration system 1255/1257 and $NO_X$ reduction system 1265/1267.

Multiple discrete aftertreatment line assemblies 1268-1271 are provided in order to accommodate the exhaust from the engine 1206. Specifically, the exhaust from the engine 1206 is separated based on the operating parameters of each of the filtration 1255/1257 and $NO_X$ reduction systems 1265/1267. As shown herein, the exhaust gas is first separated into discrete aftertreatment line assemblies 1268-1271. The exhaust gas in each of the discrete aftertreatment line assemblies 1268-1271 is then distributed into three discrete lines each having an inline filtration 1255/1257 and $NO_X$ reduction system 1265/1267 via line assembly distribution manifolds 1285-1288 (e.g., hydra head shaped coupling) to promote uniform distribution of exhaust at the face of each filtration system 1255/1257. The discrete lines further promote thermal isolation and distribution of mass loading of the system.

Each inline filtration 1255/1257 and $NO_X$ reduction system 1265/1267 includes a DOC/DPF arrangement 1255/1257 to reduce particulate matter (PM), hydrocarbons and/or carbon monoxide emissions exhaust gas. As shown herein, and specifically illustrated in FIG. 12h, the housing section associated with the DPF 1257 facilitates the removal of the DPF 1257 filters for cleaning and maintainability. Thereafter, the filtered exhaust gas is then mixed with an SCR reductant fluid or SCR reagent (e.g., urea-based, diesel exhaust fluid, ammonia or hydrocarbon) in a line leading to a $NO_X$ reduction system 1289. For example, the SCR reductant fluid or SCR reagent may be introduced by an SCR doser upstream of the SCR 1265 (e.g., mixing region at 1273). The SCR reductant fluid or SCR reagent is preferably introduced to each of the discrete aftertreatment line assemblies 1268-1271 using a common rail or single line system. The operation of the SCR doser may be controlled by a control system as described with respect to the embodiment described in FIG. 2b. Upon injection of the SCR reductant fluid or SCR reagent, the NOx from the filtered exhaust reacts with the SCR reductant fluid or SCR reagent over the catalyst in the SCR 1265 and ASC 1267 to form nitrogen and water. Although a urea-based SCR 1265 is shown, other SCR's known in the art may also be used (e.g., hydrocarbon based SCR's, De-$NO_X$ systems, etc.). The exhaust is then released into the atmosphere via a plurality of exhaust stacks 1224-1227.

The exhaust aftertreatment system 1251 is sized and shaped to fit within limited length, width, and height constraints of a locomotive 103. As shown herein, the exhaust aftertreatment system 1251 is installed within the same general framework of traditional modern diesel engine locomotives. In the embodiment shown (see FIGS. 12a and 12l), the exhaust aftertreatment system 1251 is generally located in the limited space available above the locomotive engine 1206 within the locomotive car body frame 1275.

Figure 12J:
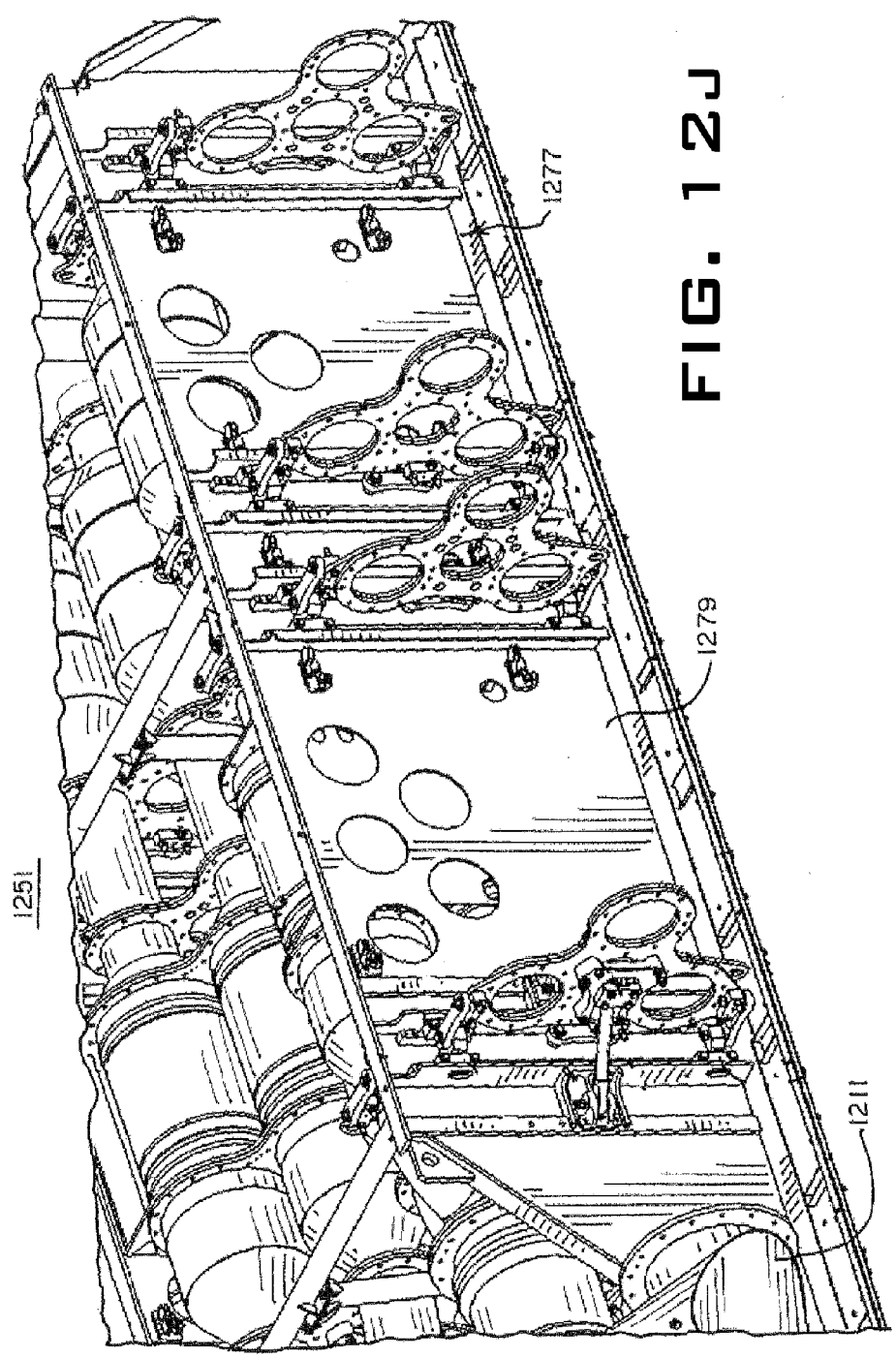
FIG. 12j is a side perspective view of the embodiment of the exhaust aftertreatment system of FIG. 12a including a support structure and connection system.
Figure 12K:
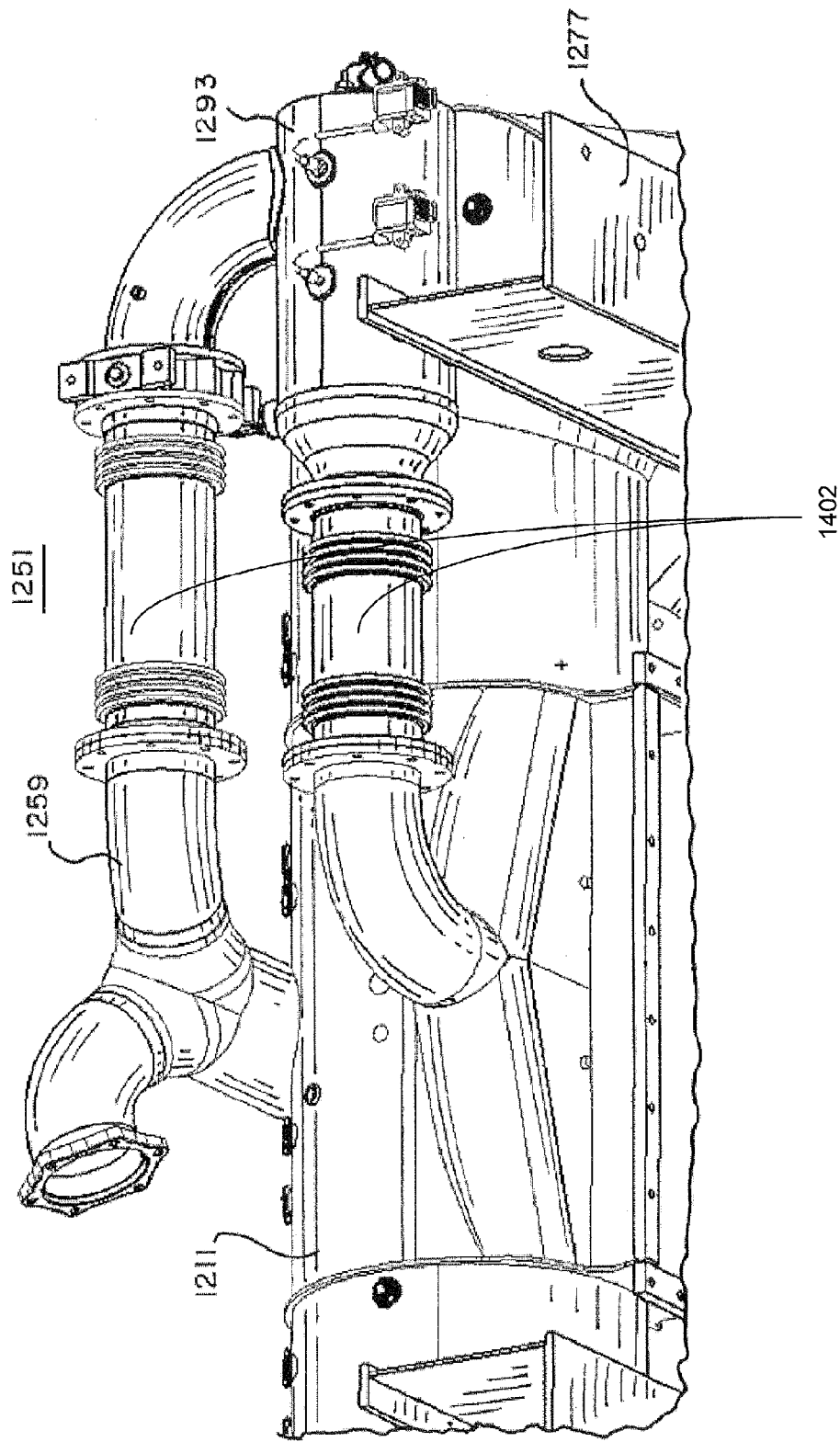
FIG. 12k is a detailed perspective view of the embodiment of the exhaust aftertreatment system of FIG. 12a showing a burner.
Figure 12L:
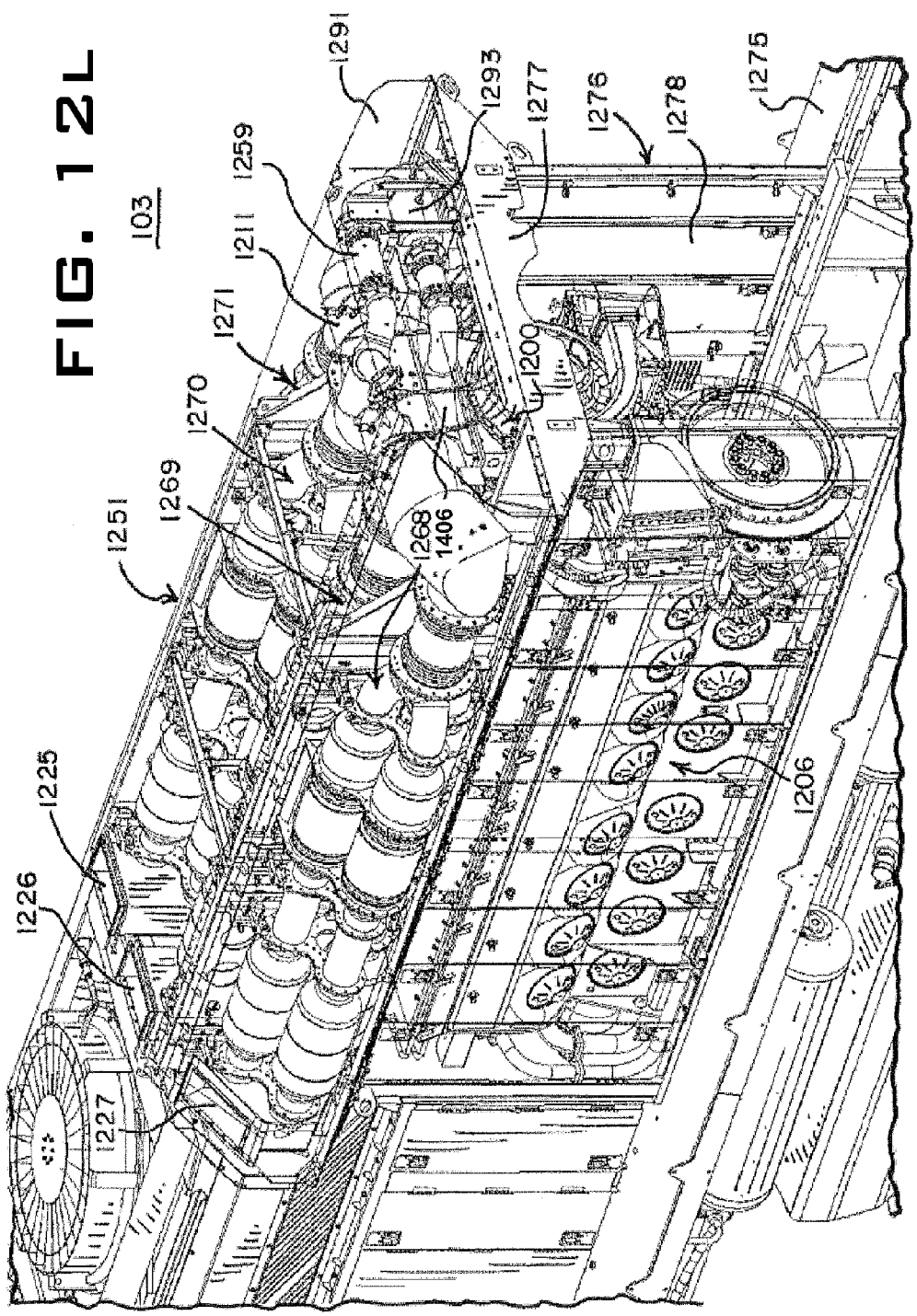

The exhaust aftertreatment system 1251 is constructed to withstand the operational loading environment of the locomotive 103. Specifically, it is required that the exhaust aftertreatment system 1251 be connected to the engine 1206 (and specifically the turbocharger stack) to receive exhaust therefrom. However, the engine 1206 cannot support the mass load of the exhaust aftertreatment system 1251. It is therefore preferable that the mass load of the exhaust aftertreatment system 1251 be supported by the locomotive structure, rather than the engine 1206. At the same time, as illustrated in FIGS. 12i and 12j, it is preferable that the operational loads associated with the engine 1206 are isolated from the operational loads associated with the locomotive structure. In this embodiment, a support structure 1277 and connection system 1283 (e.g., linkage system) is provided to mount the exhaust aftertreatment system 1251 onto the structure of the locomotive. Specifically, support structure 1277 includes support beams 1279 mounted to the locomotive structure (e.g., locomotive car body frame 1275) above the engine 1206. In order to isolate the operational loads between the engine 1206 and locomotive structure, the turbocharger mixing manifold 1211 is generally flexibly connected to the discrete aftertreatment line assemblies 1268-1271 of the exhaust aftertreatment system 1251 (e.g., via a double gimble flex coupling arrangement 1294-1297) to accommodate the motions relative to one another.

The support system 1277 and connection system 1283 may be used to thermally isolate the heat load from the exhaust aftertreatment system 1251 from the remainder of the locomotive. A hood 1291 is also provided having a ventilation system for releasing heat created by the exhaust aftertreatment system 1251.

While this disclosure has been described with reference to certain illustrative aspects, it will be understood that this description shall not be construed in a limiting sense. Rather, various changes and modifications can be made to the illustrative embodiments without departing from the true spirit, central characteristics and scope of the disclosure, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law. For example, the various operating parameters or values described herein exemplify representative values for the present disclosure system operating under certain conditions. Accordingly, it is expected that these values will change according to different locomotive operating parameters or conditions. In another example, although a urea-based SCR is shown, other SCR's known in the art may also be used (e.g., hydrocarbon based SCR's, De-$NO_X$ systems, etc.).

What is claimed:

1. A locomotive comprising:
a body frame;
a locomotive diesel engine supported directly by the body frame and including an exhaust manifold;
a support structure including support beams coupled to the body frame independent of the locomotive diesel engine;
an exhaust aftertreatment system supported directly by the support beams;
a flexible mount coupled to the support structure independent of the exhaust aftertreatment system; and
a heating device coupled to the flexible mount and having a heating device inlet end fluidly communicating with the exhaust manifold via a first flexible coupling, and a heating device outlet end fluidly communicating with the exhaust aftertreatment system via a second flexible coupling.

2. The locomotive of claim 1 further including a premixing duct positioned between the heating device outlet end and the exhaust aftertreatment system.

3. The locomotive of claim 2, in which premixing duct comprises a turbocharger mixing manifold.

4. The locomotive of claim 3, in which the turbocharger mixing manifold is flexibly coupled to the exhaust aftertreatment system.

5. The locomotive of claim 1 wherein the heating device receives exhaust gas from the exhaust manifold and is configured to increase a temperature of the exhaust gas entering the exhaust aftertreatment system.

6. The locomotive of claim 1, in which the flexible mount comprises a pivoting link.

7. A locomotive comprising:
a body frame;
a locomotive diesel engine supported directly by the body frame and including an exhaust manifold, the exhaust manifold receiving a thermal load from the engine;
a support structure including support beams coupled to the body frame independent of the locomotive diesel engine;
an exhaust aftertreatment system supported directly by the support beams and fluidly communicating with the exhaust manifold to receive a first portion of exhaust from the locomotive diesel engine; and
a burner coupled to the support structure independent of the exhaust aftertreatment system thereby to thermally isolate the burner from the engine and the exhaust aftertreatment system, the burner having an inlet end fluidly communicating with the exhaust manifold independent of the exhaust aftertreatment system to receive a second portion of exhaust from the locomotive diesel engine, and an outlet end fluidly communicating with the exhaust aftertreatment system, the burner being configured to increase a temperature of the second portion of exhaust exiting the burner outlet end.

8. The locomotive of claim 7 further comprising a flexible mount disposed between the burner and the support structure, the flexible mount being configured to isolate the burner from locomotive engine vibration.

9. The locomotive of claim 7, further comprising a premixing duct positioned between the burner outlet end and the exhaust aftertreatment system.

10. The locomotive of claim 9, in which the premixing duct comprises a turbocharger mixing manifold.

11. The locomotive of claim 10, in which the turbocharger mixing manifold is flexibly coupled to the exhaust aftertreatment system.

* * * * *